[12] United States Patent
Yamamoto et al.

(10) Patent No.: US 10,178,354 B2
(45) Date of Patent: Jan. 8, 2019

(54) STRUCTURE FOR ADJUSTING EXPOSURE OF IMAGING DEVICE

(71) Applicant: PANASONIC INTELLECTUAL PROPERTY MANAGEMENT CO., LTD., Osaka (JP)

(72) Inventors: Sei Yamamoto, Fukuoka (JP); Makoto Kamioka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 983 days.

(21) Appl. No.: 14/468,718

(22) Filed: Aug. 26, 2014

(65) Prior Publication Data

US 2016/0065820 A1 Mar. 3, 2016

(51) Int. Cl.
*H04N 7/18* (2006.01)
*H04N 5/235* (2006.01)
*H04N 9/73* (2006.01)

(52) U.S. Cl.
CPC ........... *H04N 7/183* (2013.01); *H04N 5/2351* (2013.01); *H04N 5/2353* (2013.01); *H04N 9/735* (2013.01)

(58) Field of Classification Search
None
See application file for complete search history.

(56) References Cited

U.S. PATENT DOCUMENTS

| 5,950,018 | A | * | 9/1999 | Keller | G03B 7/099 396/20 |
|---|---|---|---|---|---|
| 8,123,419 | B2 | | 2/2012 | Cirker | |
| 8,964,062 | B1 | * | 2/2015 | Neglur | H04N 5/235 348/230.1 |
| 2008/0170143 | A1 | | 7/2008 | Yoshida | |
| 2008/0185500 | A1 | | 8/2008 | Toshikiyo | |
| 2008/0224862 | A1 | | 9/2008 | Cirker | |
| 2008/0273094 | A1 | * | 11/2008 | Kunieda | H04N 1/2112 348/220.1 |
| 2009/0080878 | A1 | | 3/2009 | Cirker | |
| 2009/0160673 | A1 | | 6/2009 | Cirker | |
| 2010/0019927 | A1 | | 1/2010 | Cirker | |
| 2011/0103786 | A1 | | 5/2011 | Cirker | |
| 2012/0086825 | A1 | * | 4/2012 | Yost | H04N 5/23222 348/216.1 |
| 2012/0113263 | A1 | | 5/2012 | Cirker | |
| 2012/0314063 | A1 | | 12/2012 | Cirker | |

OTHER PUBLICATIONS

U.S. Appl. No. 14/468,571, filed Aug. 26, 2014.

* cited by examiner

*Primary Examiner* — James M Anderson, II
(74) *Attorney, Agent, or Firm* — Greenblum & Bernstein, P.L.C.

(57) ABSTRACT

An image-capturing apparatus for capturing an image includes an imaging device, configured to obtain an image signal, a light-intensity estimator, configured to estimate a light intensity outside a shutter that limits an image capturing area of the imaging device in a state where the shutter is closed, and an exposure adjustor, configured to adjust an exposure of the imaging device located inside the shutter according to the estimated light intensity.

19 Claims, 16 Drawing Sheets

FIG. 6

| | CAMERA 200A (IP ADDRESS: IpA) | CAMERA 200B (IP ADDRESS: IpB) | CAMERA 200C (IP ADDRESS: IpC) | CAMERA 200D (IP ADDRESS: IpD) | CAMERA 200E (IP ADDRESS: IpE) |
|---|---|---|---|---|---|
| SENSOR 510A1 | PRESET AP1 | PRESET BP2 | PRESET CP2 | PRESET DP1 | PRESET EP4 |
| SENSOR 510A2 | PRESET AP3 | PRESET BP3 | PRESET CP1 | | PRESET EP2 |
| SENSOR 510C1 | PRESET AP3 | PRESET BP3 | PRESET CP1 | | PRESET EP2 |
| SENSOR 510C2 | PRESET AP2 | PRESET BP4 | PRESET CP4 | PRESET DP3 | PRESET EP3 |
| SENSOR 510E1 | | PRESET BP1 | PRESET CP3 | PRESET DP2 | PRESET EP1 |
| SENSOR 510E2 | PRESET AP2 | PRESET BP4 | PRESET CP4 | PRESET DP3 | PRESET EP3 |

T11

FIG. 12A
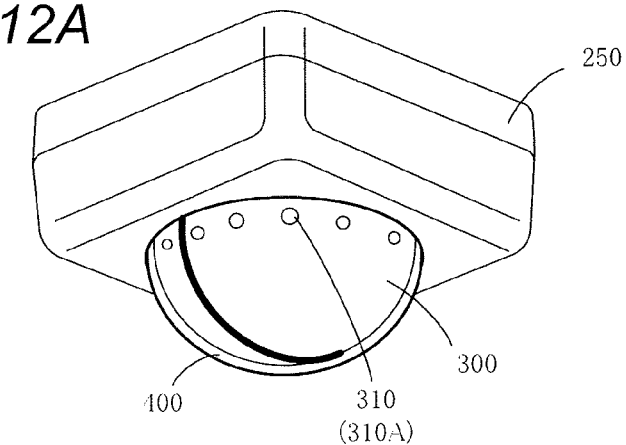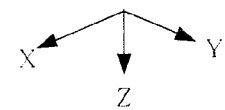
FIG. 12B
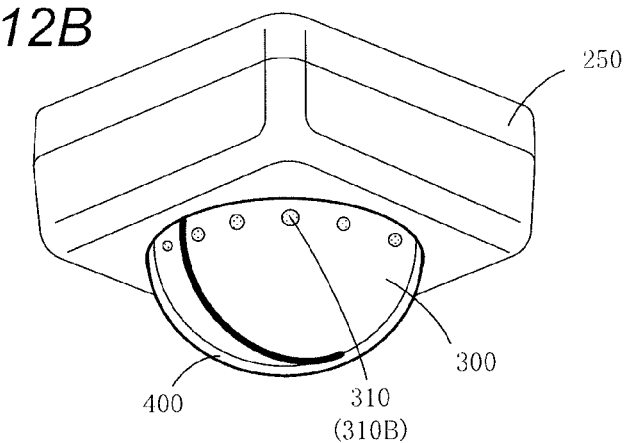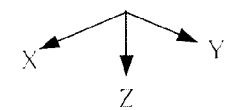
FIG. 12C
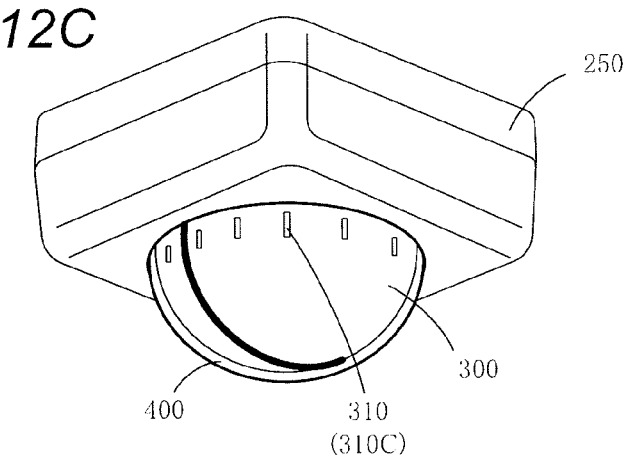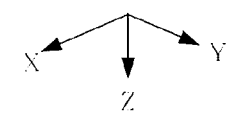

FIG. 16A

| TIME ZONE | ESTIMATED LIGHT INTENSITY | ESTIMATED LIGHT COLOR |
|---|---|---|
| DAYTIME ZONE | $\alpha 1$ | $\beta 1$ |
| SUNRISE TIME ZONE OR SUNSET TIME ZONE | $\alpha 2$ | $\beta 2$ |
| NIGHTTIME ZONE | $\alpha 3$ | $\beta 3$ |

FIG. 16B

| WEATHER | ESTIMATED LIGHT INTENSITY | ESTIMATED LIGHT COLOR |
|---|---|---|
| FINE | $\alpha 4$ | $\beta 4$ |
| CLOUDY | $\alpha 5$ | $\beta 5$ |
| RAINY | $\alpha 6$ | $\beta 6$ |
| SNOWY | $\alpha 7$ | $\beta 7$ |

STRUCTURE FOR ADJUSTING EXPOSURE OF IMAGING DEVICE

BACKGROUND

1. Technical Field

The present invention relates to an art for adjusting an exposure of an imaging device.

2. Background Art

In a related art, a camera system that includes a camera device and a shutter which covers the camera device, and exposes or obstructs the camera lens depending on the opening and closing of the shutter, is known. In the camera system, in a case where the shutter is in a closed state, the camera lens is obstructed and privacy of a person who is present in the image capturing area of the camera device can be protected. In a case where the shutter is in an open state, the camera lens is exposed and an image of a subject that is present in the image capturing area of the camera device is captured, and then security can be protected.

SUMMARY

In the camera system of the related art, it is insufficient to protect the privacy or to secure the security.

An aspect of the present invention provides a structure for estimating or obtaining a light intensity outside a shutter that limits an image capturing area of an imaging device in a state where the shutter is closed and adjusting an exposure of the imaging device located inside the shutter.

According to the aspect of the present invention, it is possible to improve the level of protecting the privacy or ensuring the security.

BRIEF DESCRIPTION OF THE DRAWINGS

In the accompanying drawings:

FIG. 6 is a schematic diagram illustrating an example of an information table which shows the relationship between each sensor and a preset position of each camera device in the embodiment;

FIGS. 12A to 12C are perspective views illustrating a first modification example of a structure in the vicinity of a camera device and a shutter when the shutter is in a closed state in the first embodiment;

FIG. 16A is a schematic diagram illustrating an example of a time table including information on an estimated light intensity and an estimated light color in each time zone in the third embodiment; and FIG. 16B is a schematic diagram illustrating an example of a weather information table including information on an estimated light intensity and an estimated light color in each time zone in the third embodiment.

DETAILED DESCRIPTION

Hereinafter, embodiments of the present invention will be described with reference to the drawings.

First Embodiment

Figure 1:
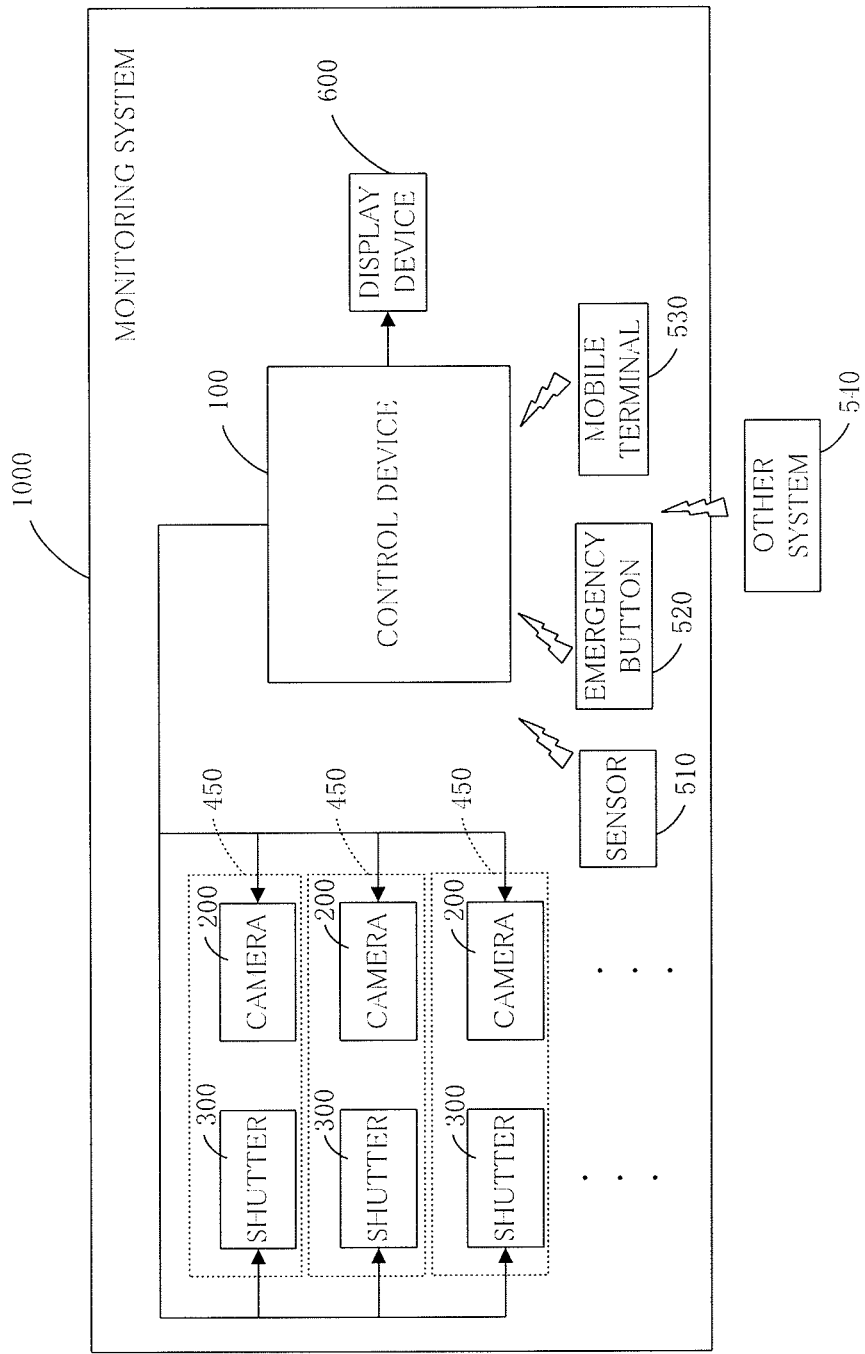
FIG. 1 is a block diagram illustrating a configuration example of a monitoring system in an embodiment.

FIG. 1 is a block diagram illustrating a configuration example of a monitoring system 1000 in the embodiment. The monitoring system 1000 includes a control device 100, a camera device 200, a shutter 300, a sensor 510, an emergency button 520, a mobile terminal 530, and a display device 600. The sensor 510, the emergency button 520, or the mobile terminal 530 can be omitted.

The control device 100 is, for example, disposed in the monitoring center and operates as a monitoring server. Alternatively, the control device 100 may be, for example, disposed for each camera device 200 or for each predetermined area where one or more camera devices 200 are arranged, and may be in cooperation with the central server of the monitoring center.

The camera device 200 is installed on the wall or ceiling of, for example, various facilities, a predetermined room in the facilities, or a predetermined area of the room in the facilities. The camera device 200 is, for example, capable of rotating in a panning direction and in a tilting direction, and captures an image of a subject which is present in a predetermined area. The camera device 200, for example, includes an omni-directional camera and a PTZ camera and operates as a network camera.

The PTZ camera as an example of the camera device 200 is a camera capable of changing the image capturing area (image capturing direction and zoom factor) by a PTZ operation. The PTZ operation is an operation that includes at least one of panning (P), tilting (T), and zooming (Z). In addition, the PTZ camera is controlled in PTZ by the control device 100. The PTZ control is a control that includes at least one of the panning control (P), the tilting control (T), and the zooming control (Z).

The omni-directional camera as an example of the camera device 200 captures an omni-directional image in all area. The omni-direction (all direction) means, for example, all around (360 degrees) of the camera device 200 (for example, all direction of planes along the X-Y plane). In the omni-directional camera, the PTZ operation is implemented by software. An arbitrary area in the capturable area of the omni-directional camera is masked (unselected) by the control device 100 or the camera device 200 after the image capturing in the omni-directional image capturing area.

The shutter 300 is driven by a drive member in response to the instruction signal from the control device 100 and then opened and closed. Therefore, the shutter 300 limits the image capturing area captured by the camera device 200. Namely, the image capturing area is narrowed when the shutter 300 closes, and the image capturing area is widened when the shutter 300 opens.

The shutter 300, in a closed state, visually obstructs the front surface of the camera lens 260 (refer to FIG. 2A) in the image capturing direction of the camera device 200. As a result, the image capturing by the camera device 200 becomes impossible. In addition, the shutter 300, in an open state, visually opens the front surface of the camera lens 260 (refer to FIG. 2C) in the image capturing direction of the camera device 200. As a result, the image capturing by the camera device 200 becomes possible.

When the shutter 300 is in the open state, the camera lens 260 is in a state of being visible and recognizable by a person who exists in the area where the camera device 200 is disposed. The shutter 300 may be in an intermediate state where a part of the image capturing area of the camera device 200 is limited (refer to FIG. 2B). In the intermediate state, there may be a plurality of states according to a degree of limitation.

Another example of the structure of the shutter 300 is, for example, described in U.S. Pat. No. 8,123,419, the contents of which are incorporated herein by reference.

One or more camera devices 200 and shutters 300 are respectively provided in the monitoring system 1000. For example, one shutter 300 is provided for each camera device 200. The shutter 300 may not be provided separately from the camera device 200, but the shutter 300 and the camera device 200 may be configured integrally with each other as illustrated by a reference numeral 450 in FIG. 1.

The sensor 510 includes various sensors that measure, for example, a mechanical, an electromagnetic, a thermal, an acoustic, or a chemical property in the predetermined area, and convert the measured result to a predetermined signal. The sensor 510 broadly includes, for example, a motion sensor, a smoke sensor (a smoke detector), a human sensor, a door opening and closing sensor, a window opening and closing sensor, an infrared sensor, a light sensor, a magnetic sensor, a temperature sensor, a voice sensor, a distance measuring sensor, a position sensor, and other sensors.

The emergency button 520 includes, for example, an emergency button fixedly installed in the predetermined area.

The mobile terminal 530 includes, for example, a smart phone, a personal digital assistant, a pendant microphone (a pendant-type infrared wireless microphone), various remote controllers, a portable emergency warning apparatus, a personal computer (PC), and other operational equipment.

Another system 540 includes, for example, a visiting and leaving management system that manages the visiting and leaving in a predetermined area, and an authentication system that authenticates a person to enter a predetermined area.

In a case where the sensor 510 detects predetermined information, the sensor 510, for example, informs the control device 100 of the predetermined information via the network.

The emergency button 520 is pressed by a person who exists in a predetermined area, and for example, informs the control device 100 of the information indicating that the emergency button 520 is pressed, via the network.

The sensor 510 or the emergency button 520 may be incorporated in the camera device 200. Alternatively, one or more sensors 510 or the emergency buttons 520 may be provided for each predetermined area, or one or more sensors 510 or the emergency buttons 520 may be provided for each camera device 200.

The mobile terminal 530 is, for example, possessed by a user, and includes a communication unit, operation unit, control unit, and various sensors. The mobile terminal 530 informs, for example, when predetermined information is detected or a predetermined button is pressed, the control device 100 of the predetermined information or the information indicating that the predetermined button is pressed, via the network.

The other system 540 includes, for example, various systems provided separately from the monitoring system 1000 (for example, the visiting and leaving management system 2000 (refer to FIG. 7) and the authentication system). The other system 540 informs the control device 100 in the monitoring system 1000, for example, of the information obtained by the processing in the other systems 540 via, for example, the network.

The information from at least one of the sensor 510, the emergency button 520, the mobile terminal 530, and the other systems 540 may be reported to the camera device 200 instead of being reported to the control device 100.

The display device 600 is disposed, for example, at the monitoring center. As a result, a security guard can visually recognize and monitor the predetermined area. The display device 600 may be, for example, a large screen display installed at the monitoring center or may be a small display on a mobile terminal which the security guard has for security activity. In the display device 600, for example, a plurality of areas may be displayed on the divided screen, or a captured image of one area combined with information about the area may be displayed on the screen.

For example, warning information may be displayed on the display device 600 in a case where a threat occurs in a predetermined area. Alternatively, the warning information may be transmitted to another communication device, and inform by, for example, image or sound, instead of being displayed on the display device 600.

Next, an example of a structure in the vicinity of the camera device 200 and the shutter 300 will be described.

Figure 2A:
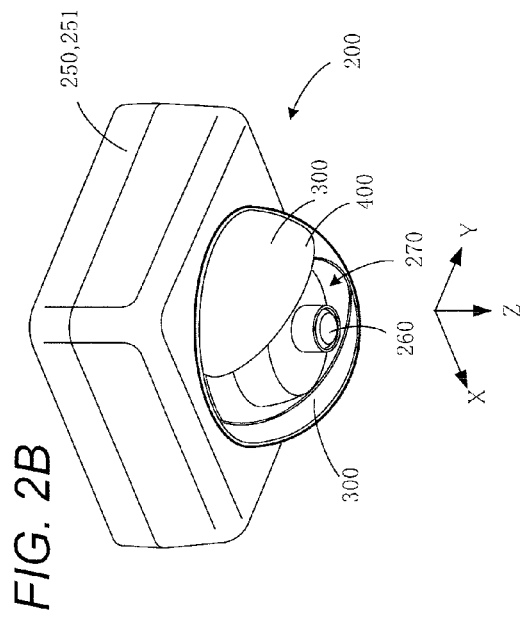
FIG. 2A is a perspective view illustrating an example of a structure in the vicinity of a camera device and a shutter when the shutter is in an open state in the embodiment.
Figure 2B:
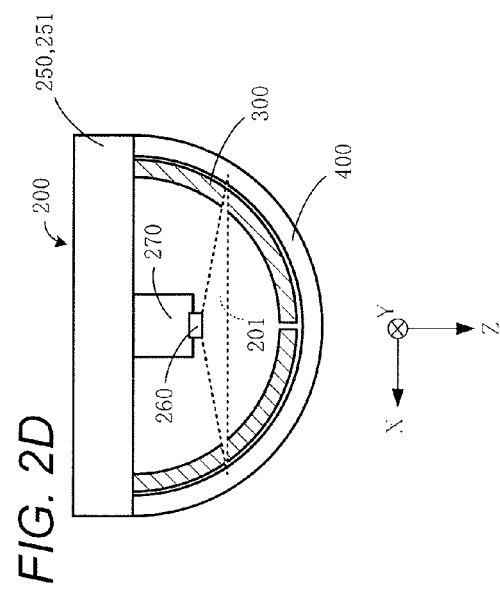
FIG. 2B is a perspective view illustrating an example of a structure in the vicinity of a camera device and a shutter when the shutter is in an intermediate state in the embodiment.
Figure 2C:
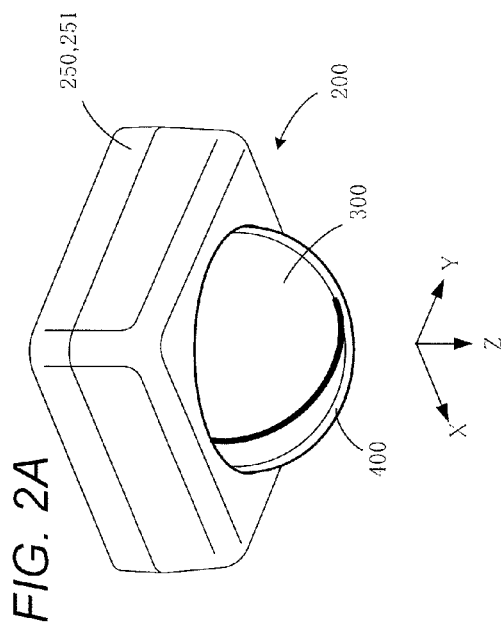
FIG. 2C is a perspective view illustrating an example of a structure in the vicinity of a camera device and a shutter when the shutter is in the closed state in the embodiment.
Figure 2D:
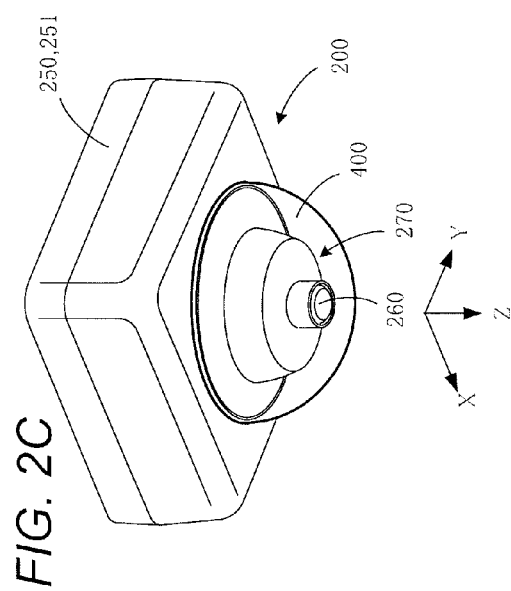
FIG. 2D is a cross-sectional view illustrating an example of a structure in the vicinity of a camera device and a shutter in the embodiment.

FIGS. 2A to 2D are perspective views illustrating the structure in the vicinity of the camera device 200 and the shutter 300. FIG. 2A illustrates a case of the shutter 300 being in an open state. FIG. 2B illustrates a case of an intermediate state where the shutter 300 is in the state between the open state and the closed state. FIG. 2C illustrates a case of the shutter 300 being in a closed state. FIG. 2D is a cross-sectional view illustrating the example of the structure in the vicinity of the camera device 200 and the shutter 300 illustrated in FIG. 2A.

In the camera device 200, the optical unit 270 is mounted on the camera base 250 via a predetermined holding mechanism. The optical unit 270 includes a camera lens 260 and a lens holder. An unillustrated board is incorporated in a housing 251 of the camera base 250. Various electronic components are mounted on the board. The electronic components include, for example, components for supplying a power to the components in the camera device 200, outputting some images, or executing image processing. The electronic components include a digital signal processor (DSP) as described later. The camera base 250 may include a driving tool which opens and closes the shutter.

The camera base 250 is installed and fixed, for example, on the wall of ceiling in a predetermined area. FIG. 2A illustrates the state of the shutter 300 being closed. In this case, since the shutter 300 has a substantially semispherical dome-shape, the camera device 200 cannot be visually recognized from the surroundings. In addition, in a case where the shutter 300 is in the closed state, an image capturing area 201 of the camera device 200 is limited to the inside of the shutter 300, which is the state of the image capturing being impossible.

The open and closed state of the shutter 300 is changed by a drive member (not illustrated). In a case where the shutter 300 is in the open state by an operation of the drive member as illustrated in FIG. 2C, at least a part of the substantially dome-shaped shutter 300 is opened along the substantially semispherical surface from the front of the image capturing direction, and is accommodated, for example, in the camera base 250. In a case where the shutter 300 is in the open state, the optical unit 270 (including the camera lens 260) of the camera device 200 can be visually recognized from the front of the image capturing direction. In a case where the camera base 250 is mounted on the ceiling, for example, it means that the front of the image capturing direction is a downward direction (positive direction on a Z-axis).

The transparent cover 400 is formed of, for example, a transparent material and a transparent material, and surrounds the shutter 300 which houses or exposes the camera device 200. The camera device 200 is, even in a case where the shutter 300 is in the open state, surrounded by the camera base 250 (refer to FIG. 2A) and the transparent cover 400. The transparent material and the transparent material include, for example, polymethyl methacrylate (PMMA) and polycarbonate (PC).

By covering the camera device 200 with the transparent cover 400, the camera device 200 can have, for example, excellent waterproofness, dust resistance and light resistance. In addition, influence by the transparent cover 400 on the captured image is equal to or lower than a predetermined level, and it is possible to sufficiently secure the security by analyzing the captured image.

Next, the configuration example of the control device 100 will be described.

Figure 3:
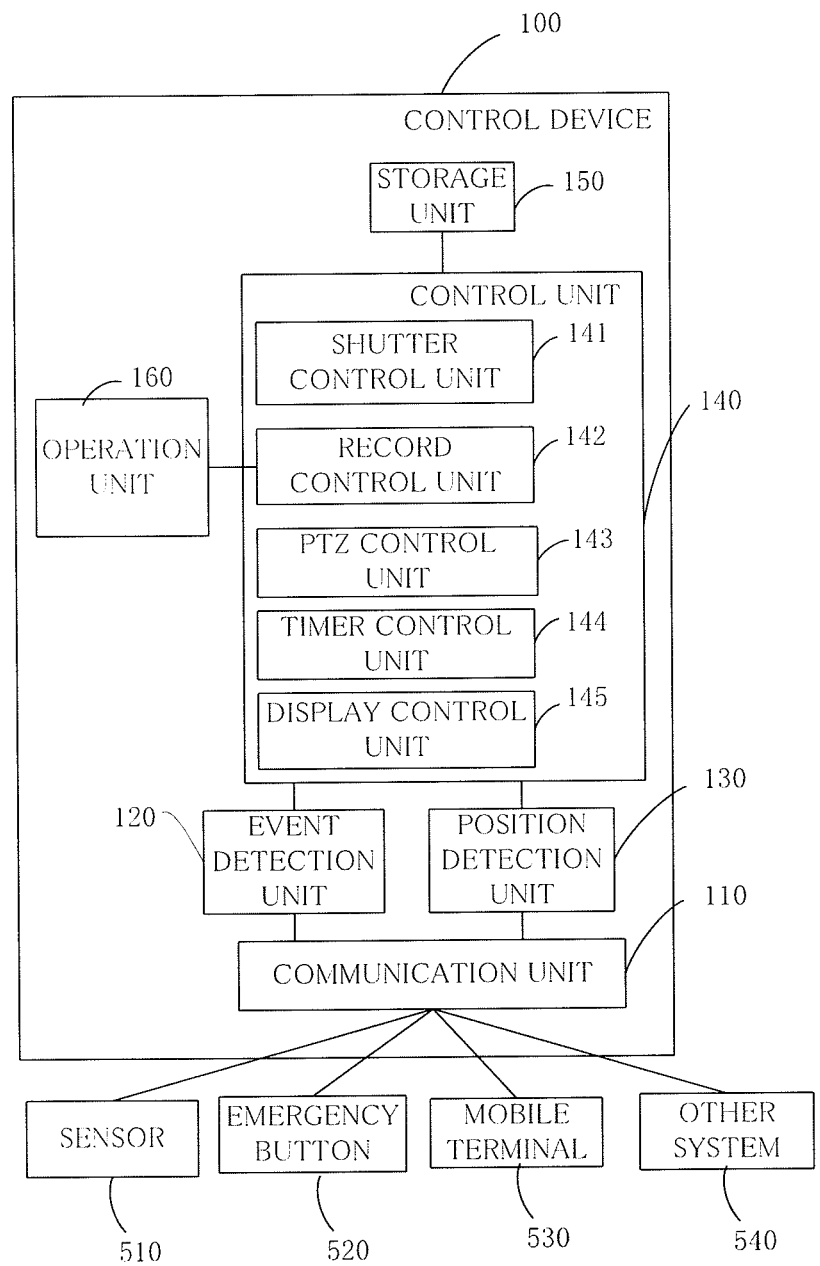
FIG. 3 is a block diagram illustrating a configuration example of a control device in the embodiment.

FIG. 3 is a block diagram illustrating the configuration example of the control device 100. The control device 100 includes a communication unit 110, an event detection unit 120, a position detection unit 130, a control unit 140, a storage unit 150, and an operation unit 160.

The communication unit 110 communicates various kinds of information, for example, with the sensors 510, the emergency button 520, the mobile terminal 530, or the other system 540. The communication unit 110 may communicate via the wired network or via the wireless network. In addition, the communication unit 110 may perform communication such as infrared communication, short range communication, and others.

The communication unit 110 receives the measured information measured by the sensors 510 or information indicating that the emergency button 520 is pressed. In addition, for example, the communication unit 110 receives the information detected by the mobile terminal 530 or the information indicating that a predetermined button is pressed. In addition, the communication unit 110 receives the information obtained by a processing in the other system 540.

The event detection unit 120 detects an event of opening and closing of the shutter 300 based on information received by the communication unit 110 from each device. The event includes, for example, an opening event for opening the shutter 300 and a closing event for closing the shutter 300. For example, the opening event is detected in a case where the threat level is comparatively high, and the closing event is detected in a case where the threat level is comparatively low. The state where the threat level is comparatively high includes, for example, a state where the sensor 510 reacts, and the state where the threat level is comparatively low includes, for example, a state where the sensor 510 does not react.

The event detection unit 120 determines that it is the opening event in a case where, for example, the emergency button 520 is pressed and the emergency warning is received by the communication unit 110 and in a case where information of an authentication error is received by the communication unit 110. In addition, the event detection unit 120 determines that it is the opening event in a case where, for example, a suspicious person enters the predetermined area (for example, in a classroom) and the information is reported by a teacher's mobile terminal. In addition, the event detection unit 120 determines that it is the opening event in a case where, for example, a suspicious person is detected in the visiting and leaving management system or in a case where an authentication error is detected in the authentication system.

In addition, the event detection unit 120 determines that it is the closing event in a case where, for example, the teacher in class requests via a smart phone for the shutter 300 to be closed for the protection of the privacy, and the request signal is received by the communication unit 110.

The position detection unit 130 identifies a device that transmits the information received by the communication unit 110, and detects a position where the device exists or is installed. The position may be detected, for example, using an Internet Protocol (IP) address of the camera device 200 arranged in a predetermined area or a Media Access Control (MAC) address. In addition, the position may be detected using a host name that is uniquely given to the camera device 200. In addition, for example, in a case where the device is a mobile device, the position may be detected using the Global Positioning System (GPS).

The control unit 140 integrally administrates each unit in the control device 100. In addition, the control unit 140 includes a shutter control unit 141, a record control unit 142, a PTZ control unit 143, a timer control unit 144, and a display control unit 145. The control unit 140 realizes various functions by, for example, a control program stored in the storage unit 150 being executed by a CPU.

The shutter control unit 141 controls the opening and closing of the shutter 300. The record control unit 142 controls such that the image captured by the camera device 200 is recorded, or the voice collected by the microphone is recorded.

The PTZ control unit 143 instructs the camera device 200 to perform, for example, the PTZ control in a predetermined timing. For example, the PTZ control unit 143 controls the image capturing area or the image capturing direction of the camera device 200 according to the position information of the sensor 510 which detects a predetermined event.

The timer control unit 144 measures, for example, current time or any period of time. For example, the display control unit 145 generates a display screen from the image captured by the camera device 200, and instructs the display device 600 so as to display the display screen, according to the screen size of the display device 600.

The storage unit 150 stores various kinds of information, various programs, and information about various tables. In addition, for example, information of the image captured by the camera device 200 and information of the voice collected by the camera device 200 may be obtained from the camera device 200 via the communication unit 110, and may be stored in the storage unit 150.

The operation unit 160 receives various operations. As an operation unit 160, which can instruct the control unit 140, for example, a key input unit, a predetermined button, a mouse, a keyboard, a microphone, and a touch panel can be considered.

Figure 4:
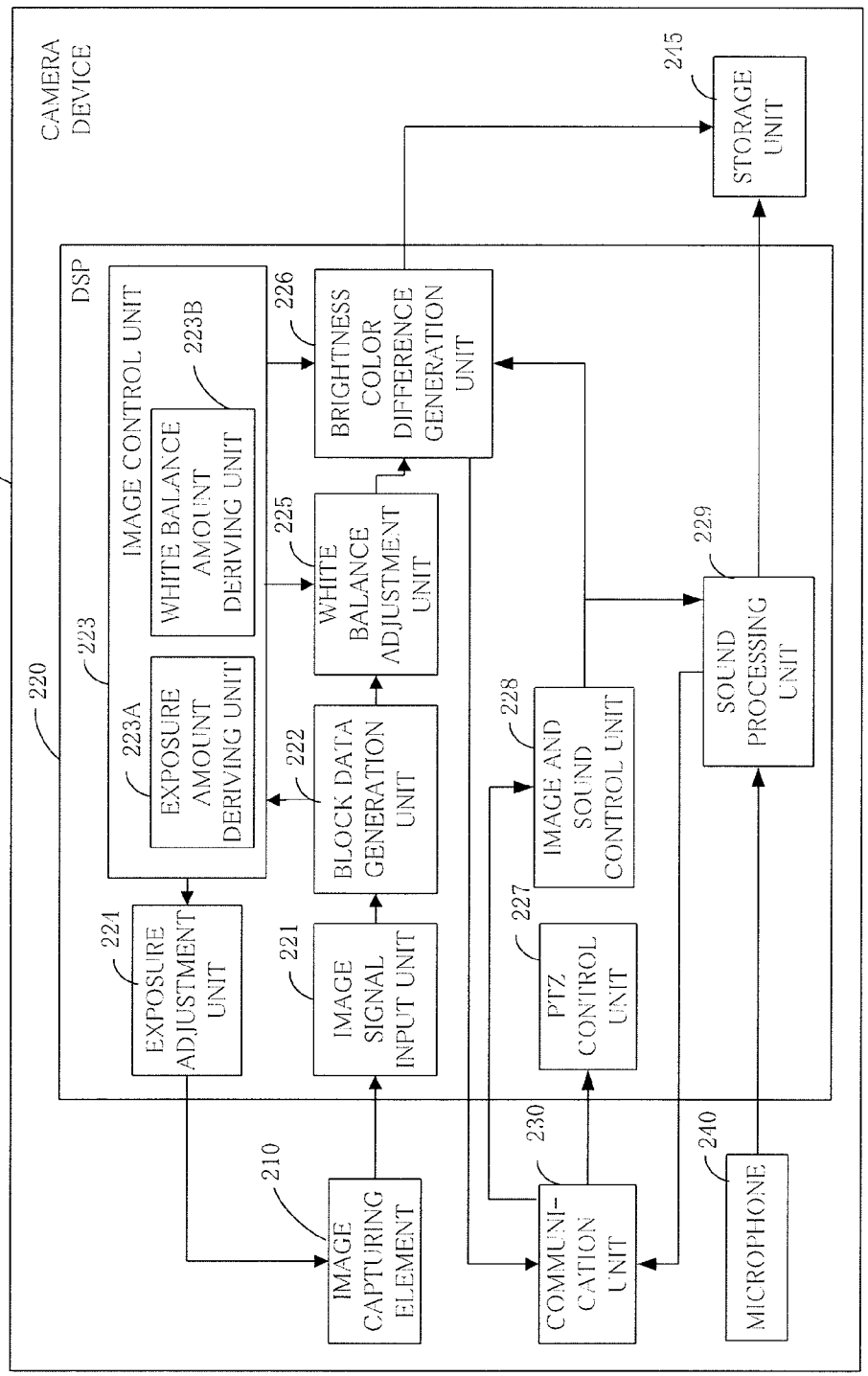
FIG. 4 is a block diagram illustrating a configuration example of a camera device in a first embodiment.

Next, a configuration example of the camera device 200 will be described. FIG. 4 is a block diagram illustrating the configuration example of the camera device 200. The camera device 200 includes an image capturing element (an imaging device) 210, a Digital Signal Processor (DSP) 220, and a communication unit 230.

The image capturing element 210 includes, for example, a Charge Coupled Device (CCD) or a Complementary Metal Oxide Semiconductor (CMOS) image sensor. The DSP 220 performs a predetermined signal processing with respect to the image signal obtained from the image capturing element 210.

The communication unit 230 is connected to the control device 100 via the network, and communicates with the control device 100 on various kinds of information. The network may be either a wired network or a wireless network. The communication unit 230 receives, for example, information about the direction of the camera device 200, or control information (for example, panning control information, tilt control information or zoom control information) which controls the image capturing area, from the control device 100.

In addition, the communication unit 230 may receive, for example, detection information or information about the detection result from the sensor 510, the emergency button 520, the mobile terminal 530, and at least one of the other systems 540. In this case, the communication unit 230 transmits the received information to the control device 100, and the opening and closing control of the shutter 300 is performed by the control device 100.

The microphone 240 acquires a sound signal (for example, a voice) surrounding the microphone 240 to convert the signal to an electric signal.

The storage unit 245 stores various kinds of information, various programs, and information about various tables. In addition, the information about the camera device 200 kept in the control device 100 may be kept in the storage unit 245 of the camera device 200.

The DSP 220 includes an image signal input unit 221, a block data generation unit 222, an image control unit 223, an exposure adjustment unit 224, a white balance adjustment unit 225, and a luminance color difference generation unit 226. In addition, the DSP 220 includes a PTZ control unit 227, a record control unit 228, and a sound processing unit 229.

The image signal input unit 221 receives an image signal from the image capturing element 210. The block data generation unit 222 divides all of the pixels of the image capturing element 210 into a plurality of blocks with a predetermined size, adds a pixel value to a color filter (each RGB filter) for each divided block, and generates block data.

The image control unit 223 includes, for example, an exposure amount deriving unit 223A and a white balance amount deriving unit 223B. The exposure amount deriving unit 223A receives the block data from the block data generation unit 222 and derives (for example, calculates) an exposure amount based on the block data. The white balance amount deriving unit 223B receives the block data from the block data generation unit 222 and derives a white balance amount based on the block data.

The exposure adjustment unit 224 adjusts the exposure amount of the image capturing element 210 using the exposure amount derived by the exposure amount deriving unit 223A. The white balance adjustment unit 225 adjusts the white balance of the block data using the white balance amount derived by the white balance amount deriving unit 223B.

The luminance color difference generation unit 226 generates luminance data Y, and color difference data Cb and Cr as exemplified below is adjusted, from the block data (RGB data) of the white balance.

$$Y = 0.299 \times R + 0.587 \times G + 0.114 \times B$$

$$Cb = -0.169 \times R - 0.331 \times G + 0.500 \times B$$

$$Cr = 0.500 \times R - 0.419 \times G - 0.081 \times B$$

The PTZ control unit 227 controls, for example, the direction of the camera device 200 based on the control information received by the communication unit 230. For example, the PTZ control unit 227 may control the direction in a horizontal direction of the camera device 200 based on the panning control information from the control device 100. In addition, the PTZ control unit 227 may control the direction in a vertical direction of the camera device 200 based on the tilt control information from the control device 100. The PTZ control unit 227 causes, for example, a motor (not illustrated) to rotate and causes the camera device 200 to pan or tilt for each predetermined angle.

In addition, the PTZ control unit 227 may control the image captured by the camera device 200 so as to be enlarged (zoom-in) or reduced (zoom-out) based on the zoom control information from the control device 100. In a case where the direction of the camera device 200 is controlled, the direction of the entire camera device 200 may be controlled or the direction of the camera lens 260 of the camera device 200 may be controlled.

In a case where the camera device 200 is an omnidirectional camera, the PTZ control in the camera device 200 is implemented in software.

The record control unit 228, for example, controls such that the image captured by the image capturing element 210 is recorded and the voice collected by the microphone 240 is recorded in the storage unit 245, according to the instruction signal (control signal) from the control device 100. In addition, the record control unit 228, for example, controls such that the recording of the captured image is stopped and the recording of the collected voice is stopped according to the instruction signal from the control device 100. The recorded image or sound information to be stored in the storage unit 245 may be transmitted to the control device 100 and be kept in the control device 100.

The sound processing unit 229 performs a predetermined signal processing with respect to an electric signal from the microphone 240.

Moreover, the case where the microphone 240 collecting the surrounding sound in the predetermined area is included in the camera device 200 is illustrated. However, the microphone 240 may be provided separate from the camera device 200.

Next, the environment for installation of the camera device 200 will be described.

The camera device 200 is, for example, installed on the ceiling or on the wall surface in a predetermined privacy-sensing area where both the security securing and the privacy protection are required. The privacy-sensing area is one of the predetermined areas. The privacy-sensing area is, for example, a part or the whole of a company, a classroom, a restroom, a dressing room, a library, a locker room, or a conference room.

In each privacy-sensing area, a privacy threshold value is assigned depending on importance of the privacy protection. For example, when the importance of the privacy protection is higher, a larger value is assigned as a privacy threshold value, and when the importance of the privacy protection is lower, a smaller value is assigned as a privacy threshold value. For example, in the privacy-sensing area such as in a restroom or a dressing room, a comparatively larger privacy threshold value is assigned, and in the privacy-sensing area such as in a library, a comparatively smaller privacy threshold value is assigned. When the privacy threshold value assigned is comparatively large, for example, in a case where a predetermined event is detected by a plurality of sensors 510, the shutter 300 may be merely opened but the captured image may not be recorded. In addition, when the privacy threshold value assigned is comparatively small, for example, in a case where a predetermined event is detected by one sensor 510, the shutter 300 may be opened and the captured image may be recorded.

For example, for each privacy-sensing area, one or more camera devices 200 are installed. In addition, the camera device 200 for which the privacy-sensing area is included in the image capturing area may be installed outside the privacy-sensing area.

In addition, the sensor 510 and the emergency button 520 may be installed, for example, in the privacy-sensing area. The mobile terminal 530 may, for example, be owned by a user located in the privacy-sensing area. At least a part of the other system 540, for example, may or may not be installed in the privacy-sensing area.

The image capturing area of the camera device 200 includes, for example, at least a part of the detection range of one or more sensors 510 installed in a fixed manner or at least a part of the target warning range of the emergency button 520. Each camera device 200 is preset so that the direction of each camera device 200 is adjusted in such a manner that the predetermined privacy-sensing area is included in the image capturing area. In addition, the number of preset position of each camera device 200 may be more than one, for example, the preset position may be prepared in advance for each sensor 510 which detects the information regarding the occurrence of an abnormality. In this case, for example, the sensor 510 which detects the information regarding the occurrence of the abnormality and the information regarding the preset position of the camera device 200 are stored in the control device 100 or in each camera device 200 in advance in association with each other.

Figure 5:
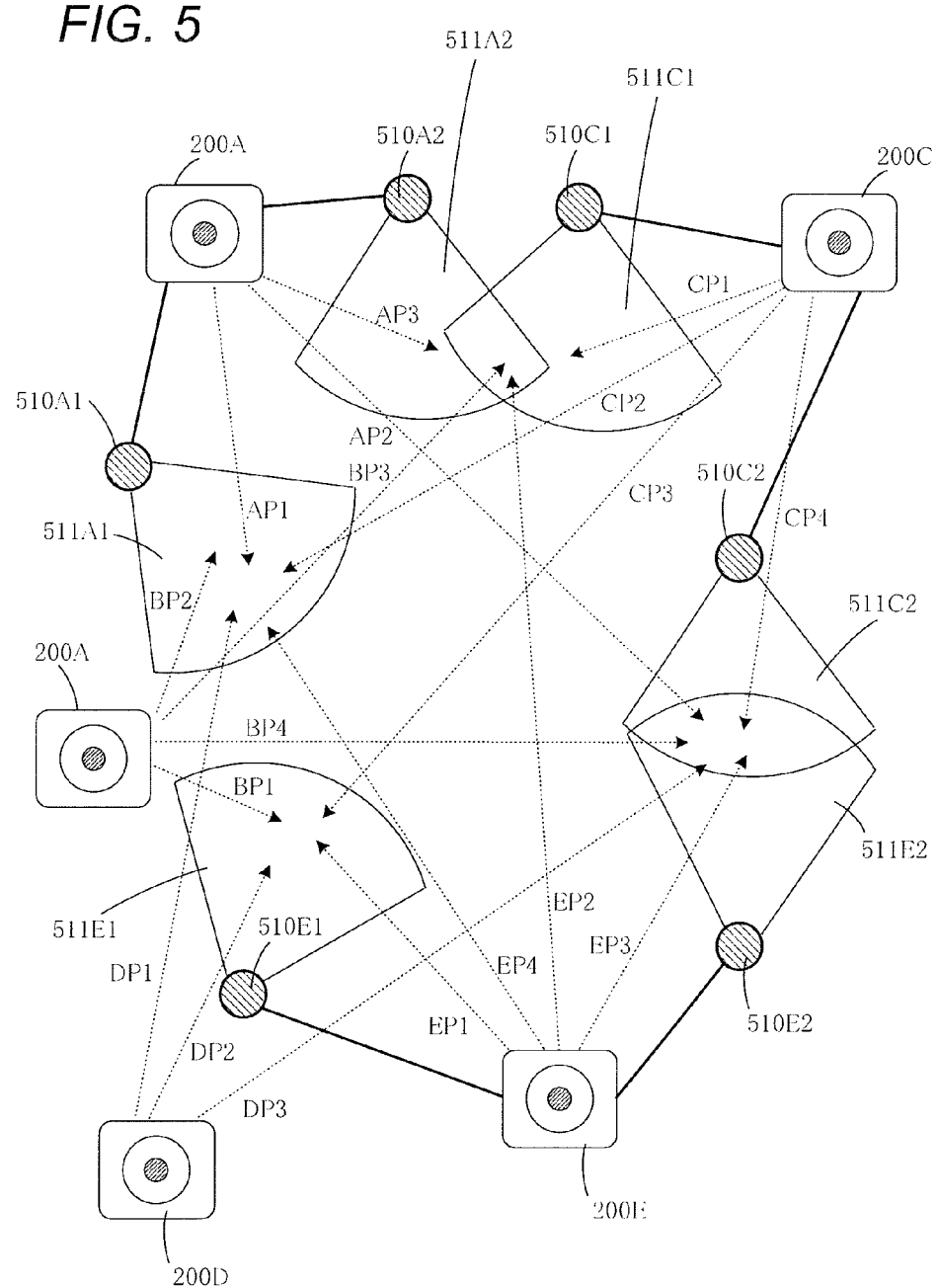
FIG. 5 is a schematic diagram illustrating an example of an arrangement of camera devices, an example of an arrangement of sensors, an example of image capturing areas of the camera devices, and an example of detection ranges of the sensors in the embodiment.

FIG. 5 is a schematic diagram illustrating an arrangement example of the camera devices 200, an arrangement example of the sensors 510, an example of image capturing areas of the camera devices 200, and an example of detection ranges of the sensors 510. As illustrated in FIG. 5, five camera devices 200 (200A to 200E) and 6 sensors (510A1, 510A2, 510C1, 510C2, 510E1, and 510E2) are installed in the privacy-sensing area. Here, a description mainly related to the camera device 200A will be given.

In FIG. 5, the sensors 510A1 and 510A2 are connected to and three preset positions AP1 to AP3 are set to the camera device 200A. The sensors 510C1 and 510C2 are connected to and four preset positions CP1 to CP4 are set to the camera device 200C. The sensors 510E1 and 510E2 are connected to and four preset positions EP1 to EP4 are set to the camera device 200E. Moreover, the sensor 510 is not connected to either of the camera devices 200B or 200D, and four preset positions BP1 to BP4 are set to the camera device 200B and three preset positions DP1 to DP3 are set to the camera device 200D.

For example, the preset position AP1 is corresponding to the detection range 511A1 of the sensor 510A1, preset position AP2 is corresponding to the detection ranges 511C2 and 511E2 of the sensors 510C2, 510E2, respectively, and the preset position AP3 is corresponding to the detection ranges 511A2 and 511C1 of the sensors 510A2 and 510C1, respectively.

That is, when the camera lens 260 of any one of the camera devices 200A to 200E is turned to the preset position AP1, it is possible to capture an image including the detection range 511A1 of the sensor 510A1. In addition, when the camera lens 260 of any one of the camera devices 200A to 200E is turning to the preset position AP2, it is possible to capture an image including the detection ranges 511C2 and 511E2 of the sensors 510C2 and 510E2, respectively. In addition, when the camera lens 260 of any one of the camera devices 200A to 200E is turning to the preset position AP3, it is possible to capture an image including the detection ranges 511A2 and 511C1 of the sensors 510A2 and 510C1.

In FIG. 5, a case where a plurality of the camera devices 200 and the sensors 510 are installed in one privacy-sensing area is illustrated. Alternatively, for example, the privacy-sensing area may be divided by a wall surface, and the camera devices 200 may be installed for each divided privacy-sensing area.

FIG. 6 is a schematic diagram illustrating an example of an information table T11 which indicates the relationship between each sensor 510 and a preset position of each camera device 200. The information table T11 is stored in the storage unit 150.

The information table T11 holds, for example, the identification information (for example, IP address) of each camera device 200A to 200E and the identification information (for example, sensor ID) of each sensor 510 in association with each other. The information table T11 includes, for example, information indicating that the preset position AP1 of the camera device 200A (IP address: IpA) is corresponding to the detection range 511A1 of the sensor

510A1. In addition, the information table T11 includes information indicating that the preset position BP2 of the camera device 200B (IP address: IpB) is corresponding to the detection range 511A1 of the sensor 510A1. In addition, the information table T11 includes information indicating that the preset position CP2 of the camera device 200C (IP address: IpC) is corresponding to the detection range 511A1 of the sensor 510A1. In addition, the information table T11 includes information indicating that the preset position DP1 of the camera device 200D (IP address: IpD) is corresponding to the detection range 511A1 of the sensor 510A1. In addition, the information table T11 includes information indicating that the preset position EP4 of the camera device 200E (IP address: IpE) is corresponding to the detection range 511A1 of the sensor 510A1.

In addition, the control device 100 may hold an information table (not illustrated) in which a sensor of another camera having a common detection range is associated with each sensor 510 (for example, sensor 510A1 and 510A2). In the information table, the sensor 510C1 of the camera device 200C is in associated with the sensor 510A2, the IP address of the camera device 200C is stored.

In FIG. 5, a case where the sensors 510 are connected to the camera devices 200 is illustrated. Alternatively, instead of the sensors 510, the emergency button 520, the mobile terminal 530, or the other system 540 may be connected thereto. In addition, at least two of the sensor 510, the emergency button 520, the mobile terminal 530, or the other system 540 may be mixed in the privacy-sensing area.

The detection range 511 may or may not be overlapped by a plurality of sensors 510. In addition, the image capturing area by a plurality of camera devices 200 may or may not be overlapped.

The control device 100 instructs the camera device 200 (for example, the camera device 200A), with reference to the information table T11, to capture the image of a detection range (for example, the detection range 511A1) where an abnormality is expected to occur, for example.

Next, as one example of the other system 540, the visiting and leaving management system 2000 will be described.

Figure 7:
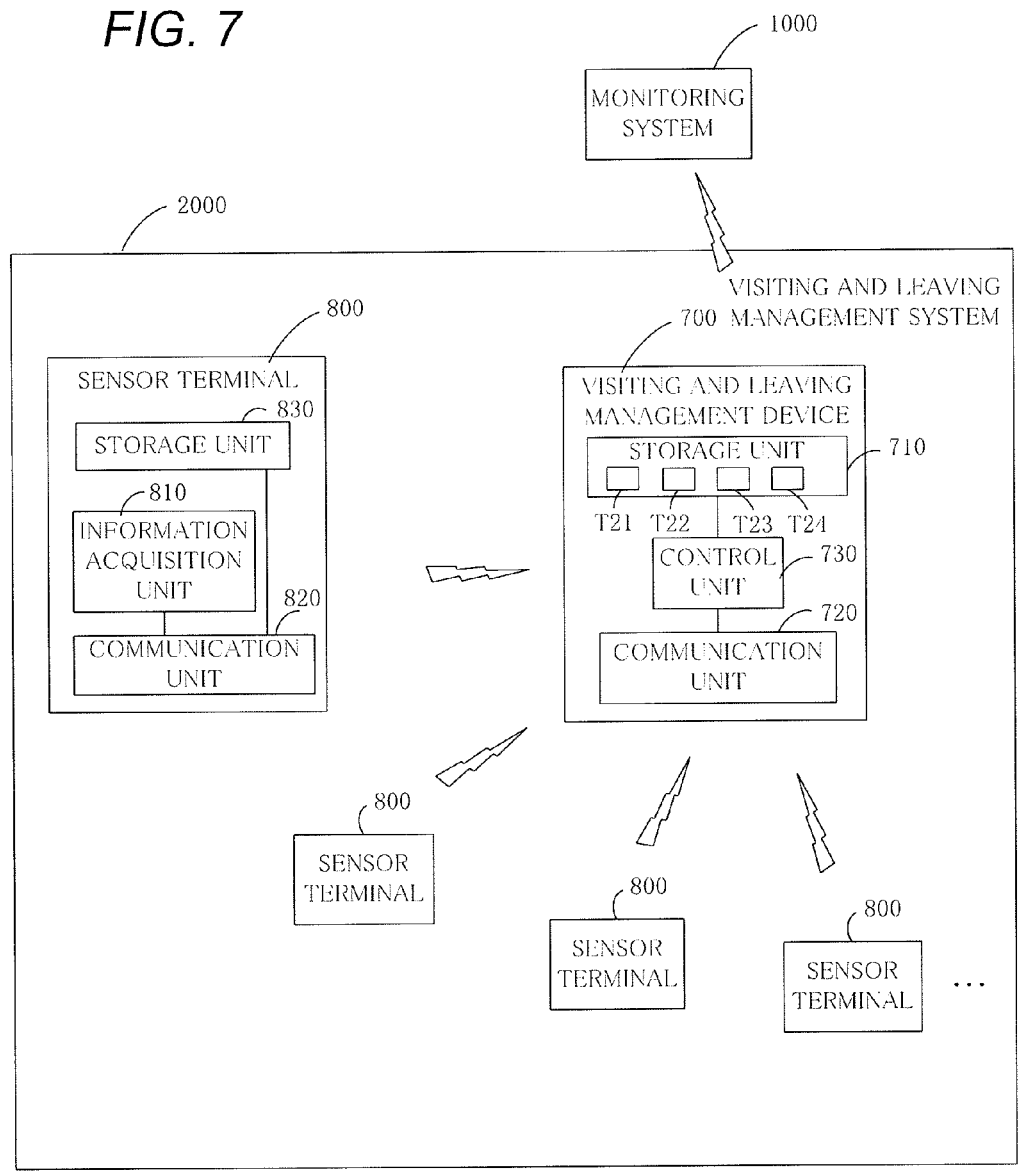
FIG. 7 is a block diagram illustrating a configuration example of a visiting and leaving management system in the embodiment.

FIG. 7 is a block diagram illustrating a configuration example of a visiting and leaving management system 2000. The visiting and leaving management system 2000 includes, for example, a visiting and leaving management device 700 and a sensor terminal 800. The visiting and leaving management device 700 and one or more sensor terminals 800 are connected to each other via a network.

The visiting and leaving management device 700 manages at least one of the visitors who enter a predetermined area and the leaving persons who leave the predetermined area. Here, it is assumed that the visitors or the leaving persons have IC cards for the management of visiting and leaving, but not limited to the IC card. In addition, for example, the functions of IC cards may be incorporated in the mobile terminal. The sensor terminal 800 is installed inside or outside of the predetermined area where the visiting and leaving is managed.

The sensor terminal 800 includes an information acquisition unit 810, a communication unit 820, and a storage unit 830. The sensor terminal 800 includes, for example, a memory and a processor, and realizes various functions (for example, an IC card reading function, an information transmission function) by the CPU executing a control program stored in the memory. Moreover, each function may be realized by a dedicated hardware instead of the software.

The information acquisition unit 810 acquires various kinds of information. For example, the information acquisition unit 810 is a card reader, and reads the card ID stored in the IC card from the IC card which is held by the bearer of the IC card, and informs the communication unit 820.

The communication unit 820 communicates, for example, various kinds of information to the visiting and leaving management device 700 via a wired network or a wireless network. For example, the communication unit 820 transmits the information about the card ID from the information acquisition unit 810 and the information about the terminal ID which identifies the sensor terminal and is stored in the storage unit 830, to the visiting and leaving management device 700.

The visiting and leaving management device 700 includes a storage unit 710, a communication unit 720, and a control unit 730.

The storage unit 710 stores various kinds of information, various tables, and a control program. The storage unit 710 stores, for example, a sensor signal holding table T21, a card information holding table T22, a visitor information holding table T23, and a leaving information holding table T24. Adding, modifying, and removing data to and from the sensor signal holding table T21 and the card information holding table T22 are implemented based on the input to the operation unit (not illustrated).

The communication unit 720 communicates with another communication device or another system (for example, the monitoring system 1000) via a wired network or a wireless network. For example, with respect to the monitoring system 1000, the communication unit 720 transmits the information on whether or not a person exists in the predetermined area. In addition, with respect to the monitoring system 1000, when a person's visiting or leaving occurs in the predetermined area, the communication unit 720 may sequentially transmit the information on the visiting or leaving (for example, information on the visitor, the leaving person, the visiting time, the leaving time, the visiting area, and the leaving area).

The control unit 730 realizes, for example, various functions (for example, an authentication processing function, a visitor information generation function, and a leaving determination function) by an execution of the control program stored in the storage unit 710 by a CPU. Moreover, various functions may be realized by a dedicated hardware instead of the software. The information on visiting and leaving is held, for example, in the visitor information holding table T23 and the leaving information holding table T24.

The sensor information holding table T21 has information indicating a correspondence between each sensor and the area where each sensor is installed. The sensor information holding table T21 holds, for each sensor terminal 800, for example, information on the sensor ID, the installation area, the area ID, and the name of area in association with each other. The sensor information holding table T21 is referenced in the authentication processing.

The sensor ID is identification information which identifies the sensor terminal 800. The installation area indicates information about the location where the sensor terminal 800 is installed. The area ID is identification information which identifies the area where predetermined information is detected by the sensor terminal 800.

The card information holding table T22 has information indicating a correspondence between the IC card used for visiting and leaving and the area where the visiting and leaving is permitted by each IC card. The card information holding table T22 holds, for each IC card, for example, information on the card ID, the name, and the permitted area ID in association each other. The card information holding table T22 is referenced in the authentication processing.

The card ID is identification information which is recorded in the IC card and identifies the IC card. The name is an IC card bearer's name, for example. The permitted area ID is identification information which identifies the area where the visiting and leaving is permitted by the IC card.

The visitor information holding table T23 has information indicating a correspondence between each visitor and the area each visitor has entered. The visitor information holding table T23 holds, for each visitor, for example, information on the visitor card ID, the visitor's name, the visiting area ID, the visiting area name, and the visiting time in association with each other. The visitor information holding table T23, for example, is referenced in a case where the control unit 730 determines whether the visitor information is recorded or removed, and is updated according to the determination result.

The visitor card ID is identification information which identifies the IC card used when the visitor enters. The ID card is included in the card ID held in the card information holding table T22. The visitor's name is, for example, a name of the visitor. The visiting area ID is identification information which identifies the area where the visitor enters, and is an area ID held in the sensor information holding table T21 in association with the sensor ID of the sensor terminal 800 installed in the area. The visiting area name is the area name held in the sensor information holding table T21 in association with the corresponding area ID.

The leaving information holding table T24 has, for example, at the time point when the shutter 300 is opened, information indicating the leaving status of the visitor who has entered each area, at a predetermined time point. The leaving information holding table T24 holds, for each entering visitor when the shutter 300 is in the open state, the card ID, the name, the area ID, the area name, and the leaving information in association with each other. The leaving information holding table T24 is, for example, referenced when the control unit 730 determines the leaving, and is updated.

The visitor's card ID, the visitor's name and the visiting area name in the leaving information holding table T24, for example, are similar to the visitor's card ID, the visitor's name, and the visiting area name held in the visitor information holding table T23 at the time point when the shutter 300 is in the open state. In addition, the leaving information is information indicating whether the visitor has left or not.

The storage unit 710 may not include the leaving information holding table T24, and when the visitor has left, the control unit 730 may remove the information about the visitor who has left, from the visitor information holding table T23. Even in this case, a person in the area can be recognized.

Here, separately from the monitoring system 1000, a case of the visiting and leaving management system 2000 is described. Alternatively, the configuration units of the monitoring system 1000 and the configuration units of the visiting and leaving management system 2000 may be partly at least in common. For example, at least a part of the storage unit, the communication unit, the control unit, the area (the privacy-sensing area), and the sensor (the sensor terminal) may be partly shared in both systems.

Figure 8:
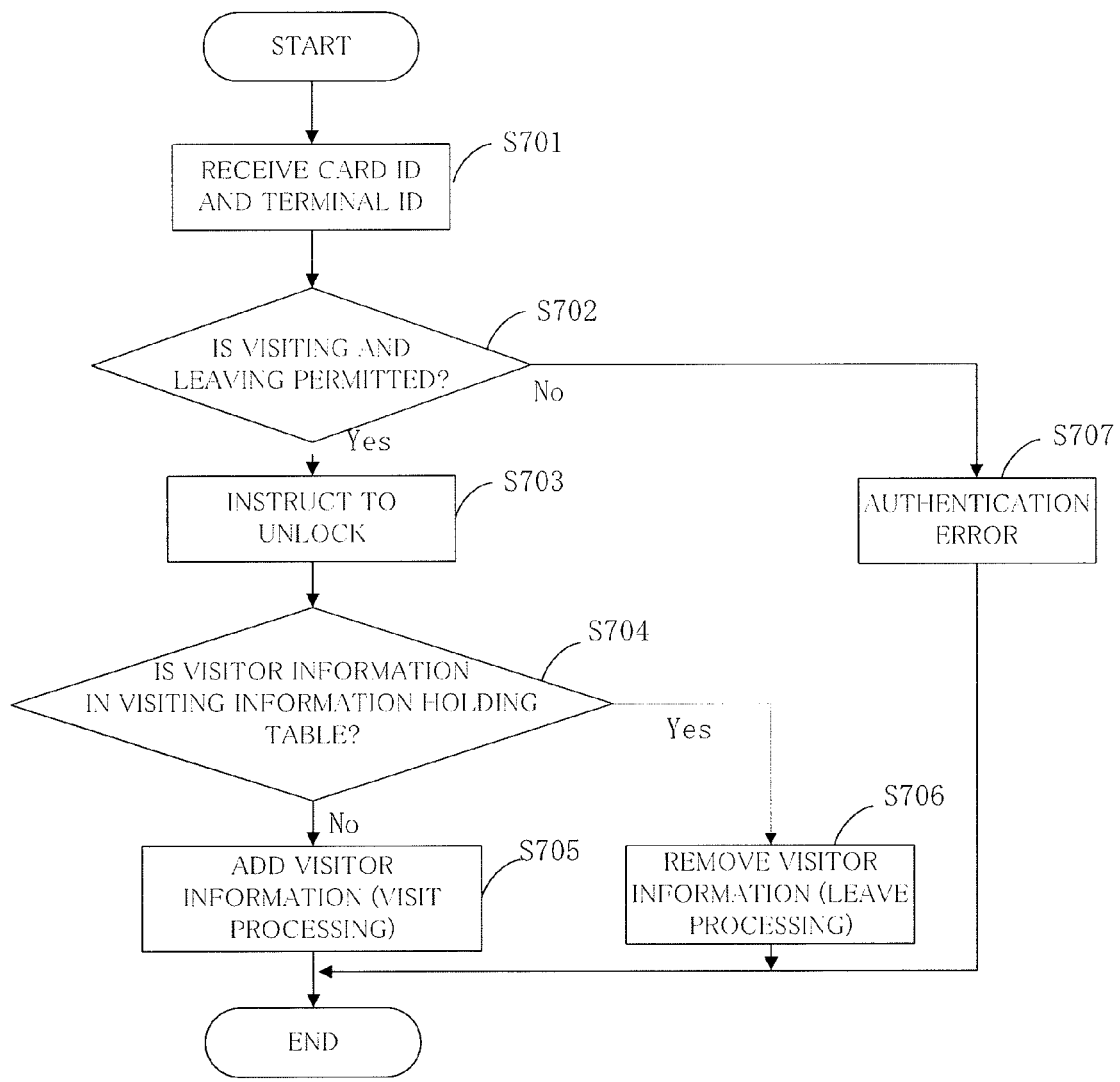
FIG. 8 is a flowchart illustrating an example of an operation of the visiting and leaving management system in the embodiment.

Next, an example of an operation of the visiting and leaving management device 700 will be described. FIG. 8 is a flowchart illustrating the example of the operation of the visiting and leaving management device 700.

First, the communication unit 720 receives the information about the card ID and the terminal ID from the sensor terminal 800 which the IC card approaches (S701).

Subsequently, the control unit 730 determines whether or not the visiting of the area where the sensor terminal 800 which the IC card approaches is installed or the leaving from such area is permitted (S702). For example, the control unit 730 determines whether or not the visiting and leaving is permitted in a case where the area ID held in the sensor information holding table T21 in association with the received terminal ID is included in the permitted area ID held in the card information holding table T22 in association with the received card ID. In a case where the visiting and leaving is not permitted, the control unit 730 determines the authentication error (S707), and the process in FIG. 8 ends.

In a case where the visiting and leaving is permitted, the communication unit 720 transmits, for example, an instruction to the sensor terminal to which the IC card approaches, to unlock the door provided at the predetermined area (S703).

Subsequently, the control unit 730 determines whether or not the visitor information which includes the received card ID and the area ID held in the sensor information holding table T21 in association with the received terminal ID are included in the visitor information holding table T23 (S704).

In a case where the visitor information is not included in the visitor information holding table T23, the control unit 730 adds the visitor information to the visitor information holding table T23, and the visiting process ends (S705).

On the other hand, in a case where the visitor information is included in the visitor information holding table T23, the control unit 730 removes the visitor information from the visitor information holding table T23, and the leaving process ends (S706).

Here, a case where the visitor information about the visitor already entered is removed as a leaving person is illustrated. Alternatively, the visiting and leaving may be determined by the terminal ID. For example, in a case where the IC card approaches the sensor terminal 800 installed in the area other than the predetermined area, the visiting and leaving management device 700 or the sensor terminal 800 may determine that the bearer of the IC card is visiting. In addition, in a case where the IC card approaches the sensor terminal 800 installed in the area within the predetermined area, the visiting and leaving management device 700 or the sensor terminal 800 may determine that the bearer of the IC card is leaving.

In this way, according to the visiting and leaving management system 2000, it is possible to grasp presence or absence of the visitor in the predetermined area. The visiting and leaving management system 2000 may provide the monitoring system 1000 with the information about the visitor in the predetermined area (for example, the information about the presence or the absence of the visitor at least a part of information included in the visitor information holding table T23) via the network. The control device 100 of the monitoring system 1000 acquires, for example, the information about the visitor from the visiting and leaving management system 2000, and may open and close the shutter 300 according to the presence or the absence of the visitor.

Next, the time table T12 held in the storage unit 150 of the control device 100 in the monitoring system 1000 will be described.

Figure 9:
FIG. 9 is a schematic diagram illustrating an example of a time table that includes information about the opening and closing of the shutter, an implementation state of the image recording, and an implementation state of sound recording in each time zone in the embodiment.

FIG. 9 is a schematic diagram illustrating an example of the time table T12. The time table T12 includes, for example, information about the opening and closing state of the shutter 300, the implementation state of the image recording, and the implementation state of sound recording in each time zone. The time table T12 is stored in the storage unit 150.

In FIG. 9, on holidays, the monitoring system 1000 sets the operation mode as a monitoring mode for the entire day (0:00 to 24:00), implements the sound recording, implements the image recording, and causes the shutter 300 to be in the open state. For example, in a case of monitoring an office, since it is estimated that employees may not exist in the office on holiday, priority to the security can be given in such a time zone.

In addition, as illustrated in FIG. 9, from 08:30 to 17:00 on weekdays, the monitoring system 1000 sets the operation mode as a non-monitoring mode, does not implement the sound recording, does not implement the image recording, and causes the shutter 300 to be in the closed state. For example, in a case of monitoring the office, since it is assumed that employees may exist in the office during work hours, priority to the privacy can be given in such a time zone.

In addition, as illustrated in FIG. 9, in 00:00 to 08:30 and 17:00 to 24:00 on weekdays, the monitoring system 1000 sets the operation mode as the monitoring mode, implements the sound recording, implements the image recording, and causes the shutter 300 to be in the open state. For example, in a case of monitoring an office, since it is estimated that a few employees may exist in the office during work-off hours, priority to the security can be given in that time zone.

Next, the example of operation of the control device 100 in a case where the shutter 300 is open and closed according to the time schedule in the time table T12 will be described. Here, two examples of operation are illustrated. A first example of operation illustrates an example of operation when the shutter 300 is open and closed under the consideration of the schedule. A second example of operation illustrates an example of operation when the shutter 300 is open and closed under the consideration of threat level as an example of an event.

Figure 10:
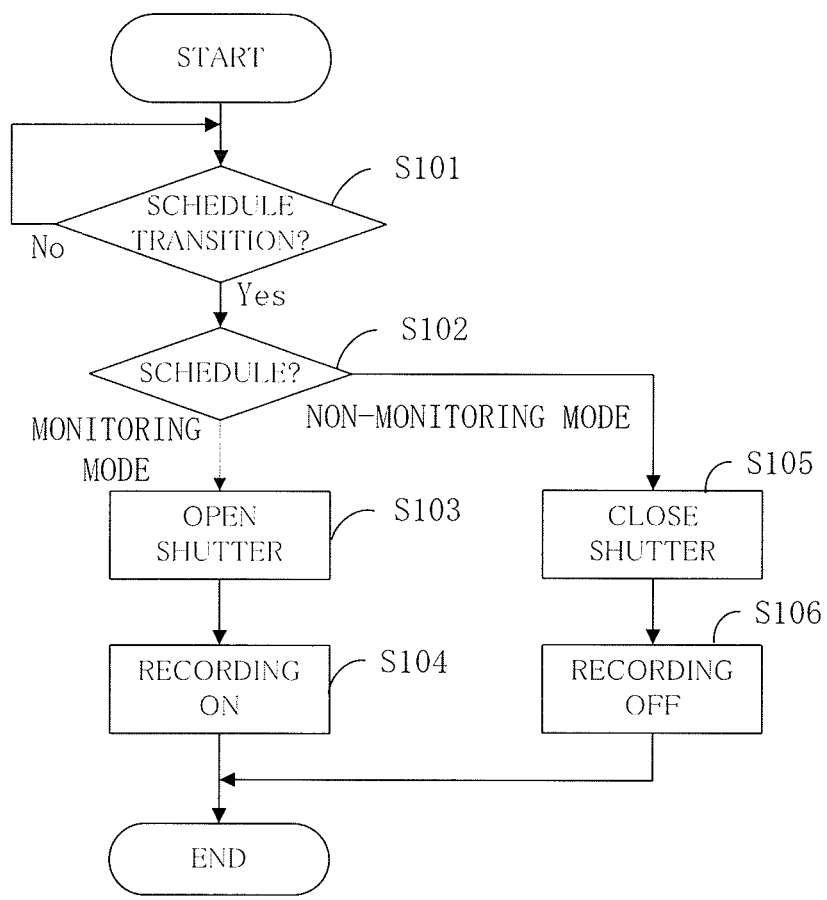
FIG. 10 is a flowchart illustrating a first example of operation of the control device in a case where the shutter is open and closed in the embodiment.

FIG. 10 is a flowchart illustrating an example of the first operation of the control device 100 in a case where the shutter 300 is open and closed.

First, the timer control unit 144 acquires information about the current time. The shutter control unit 141 determines whether or not the current time indicates a time of schedule transition with reference to the time table T12 (S101). In a case where the current time does not indicate the time of schedule transition, the step S101 is performed again.

In a case where the current time indicates the time of schedule transition, the shutter control unit 141 determines, with reference to the time table T12, whether the current time is in the time zone for monitoring mode or in the time zone for non-monitoring mode (S102). The time zone in S102 is the time zone after the schedule transition.

In a case where the current time is in the time zone for monitoring mode, the shutter control unit 141 transmits an instruction signal so as to open the shutter 300 via the communication unit 110 (S103). In addition, the record control unit 142, transmits an instruction signal via the communication unit 110 so as to start collecting the sound by the microphone 240 of the camera device 200 and to start image capturing by the image capturing element 210 (S104). When the current time is in the time zone for monitoring mode before the processing of FIG. 10 starts, the processing of S103 and S104 may be omitted.

In a case where the current time is in the time zone for non-monitoring mode, the shutter control unit 141 transmits an instruction signal with respect to the camera device 200 via the communication unit 110 so as to close the shutter 300 (S105). In addition, the record control unit 142 transmits an instruction signal via the communication unit 110 so as to stop collecting the sound by the microphone 240 of the camera device 200 and to stop image capturing by the image capturing element 210 (S106). When the current time is in the time zone for non-monitoring mode before the processing of FIG. 10 starts, the processing of S105 and S106 may be omitted.

According to the first example of operation of the control device 100, the monitoring system 1000 can operate according to the operation modes (monitoring mode and non-monitoring mode) which change depending on the schedule. In a case of the monitoring mode, the priority can be given to the securing of the security. In a case of the non-monitoring mode, the priority can be given to the protection of the privacy.

In FIG. 9 and FIG. 10, a case is illustrated where the image capturing and the sound collecting by the camera device 200 are implemented at the same time. Alternatively, the image capturing and the sound collecting may be implemented at different times. That is, in the monitoring mode, only the sound collecting may be implemented without capturing the image, or only the image capturing may be implemented without collecting the sound.

Next, the example of operation of the control device 100 in a case where the shutter 300 is open and closed depending on the threat level will be described.

Figure 11:
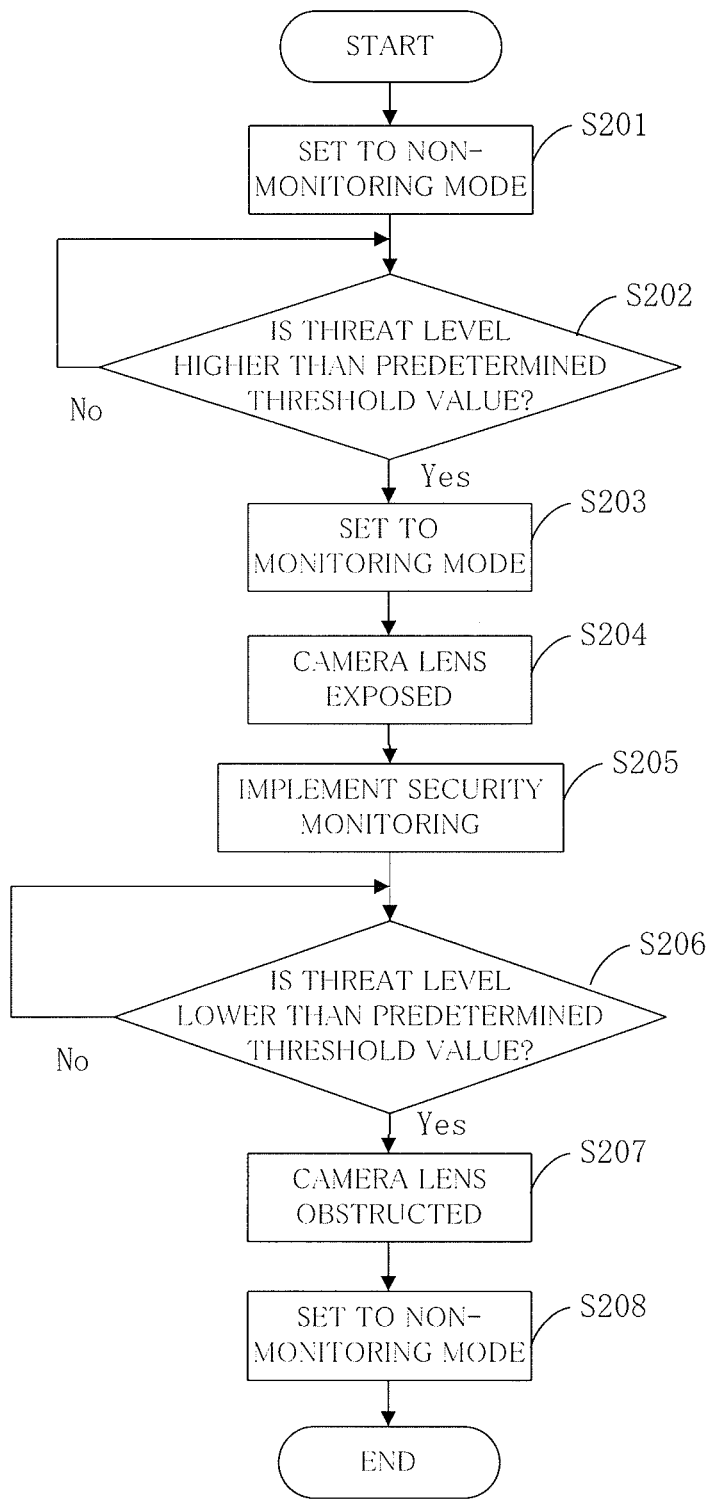
FIG. 11 is a flowchart illustrating a second example of the operation of the control device in a case where the shutter is open and closed in the embodiment.

FIG. 11 is a flowchart illustrating a second example of operation of the control device 100 in a case where the shutter 300 is open and closed. Moreover, in the second example of operation, a case where the threat level is high is an example of a case where an opening event occurs. In addition, a case where the threat level is low is an example of a case where the opening event does not occur or a closing event occurs.

In the second example of operation, the control unit 140 basically sets the operation mode of the monitoring system 1000 to the non-monitoring mode (S201). In the non-monitoring mode, the camera lens 260 is physically obstructed from the privacy-sensing area.

In a case where there is a threat at a high level, needs for safety and security take a higher priority than the need for the privacy. The threat at a high level includes, for example, a situation of a hostage or a fired shot. When the threat level exceeds a predetermined threshold value (S202), the control unit 140 transitions the operation mode to the monitoring mode (S203).

The case where the threat level exceeds a predetermined privacy threshold value, for example, includes a case where the emergency button 520 is pressed, a case where the effect that the emergency state is reported from the mobile terminal 530, and a case where a predetermined dangerous state is detected by the sensor 510.

In the monitoring mode, the shutter control unit 141 controls in such a manner that the shutter 300 is open, which enables the camera lens 260 be obstructed, and the shutter 300 moves to the position where the camera lens 260 is exposed (S204). In this way, the camera device 200 can monitor the privacy-sensing area and it is possible to secure the security with respect to the privacy-sensing area where the camera device 200 is disposed (S205).

After the step S205, after passing a predetermined time, for example, when a closing event occurs and the threat level is lower than the predetermined privacy threshold value (S206), the need for the privacy takes a higher priority than needs for the safety and the security. In this case, the shutter control unit 141 controls in such a manner that the shutter 300 is closed, and the shutter 300 returns to the position where the camera lens 260 is obstructed (S207). In addition, the control unit 140 transits the operation mode to the non-monitoring mode (S208).

The case where the threat level is lower than the predetermined threshold value, for example, includes a case where the pressing of the emergency button 520 is stopped, a case where an effect that the emergency state is terminated is notified from the mobile terminal 530, and a case where the predetermined dangerous state is not detected by the sensor 510.

According to the second example of operation of the control device 100, in a case where the threat level is comparatively high, it is possible to strengthen the security. In addition, in a case where the threat level is comparatively low, for example, by using the state that the camera device 200 is obstructed from the outside, it is possible to realize the state where a person in the privacy-sensing area does not feel the discomfort of being monitored.

Next, exposure adjustment and image processing performed by the camera device 200 will be described in detail.

The camera device 200 performs, for example, automatic exposure adjustment (AE) in a case where the shutter 300 is in an open state. In the automatic exposure adjustment, an exposure amount of the image capturing element 210 is adjusted so that, for example, a luminance component of a captured image is at a predetermined luminance level. Information on a correspondence relationship between the luminance level and the exposure amount is held in, for example, the storage unit 245. For example, the higher the luminance level is, the smaller the exposure amount is.

In addition, for example, in a case where an exposure amount obtained through the automatic exposure adjustment is not suitable and thus the exposure amount is corrected, or in a case where a monitoring person instructs an exposure amount to be input without depending on a light intensity, an exposure amount may be set by using the operation unit 160.

In addition, an exposure amount is indicated by, for example, an exposure value (EV). An exposure amount is determined, for example, according to a diaphragm and an exposure time.

In a case where the shutter 300 is in an open state, the camera device 200 performs, for example, automatic white balance adjustment. In the automatic white balance adjustment, a white balance amount for block data is adjusted so that, for example, a color component (for example, a white component) of a captured image is at a predetermined color level. Information on a correspondence relationship between the color level and the white balance amount is stored in, for example, the storage unit 245.

In addition, for example, in a case where a white balance amount obtained through the automatic white balance adjustment is not suitable and thus the white balance amount is corrected, or in a case where a monitoring person instructs a white balance amount to be input without depending on a light intensity, a white balance amount may be set by using the operation unit 160.

On the other hand, also in a case where the shutter 300 is in a closed state, for example, the camera device 200 measures a light intensity outside the shutter 300, and exposure is adjusted according to the measured light intensity. In addition, also in a case where the shutter 300 is in a closed state, for example, a light color outside the shutter 300 is measured, and white balance is adjusted according to the measured light color.

Therefore, since the shutter 300 is opened in a state where the camera device 200 has undergone the exposure adjustment or the white balance adjustment, it is possible to prevent an exposure amount or a white balance amount from being changed when the shutter 300 is opened. Thus, it is possible to minimize deterioration (overexposure) in a captured image when the shutter 300 is opened.

Next, letting-in of light outside the shutter 300 will be described.

FIGS. 12A to 12C are perspective views illustrating a first modification example of a structure in the vicinity of a camera device and a shutter in a state where the shutter 300 is closed. In FIGS. 12A to 12C, the shutter 300 includes a light letting-in part 310. In FIG. 12A, the shutter 300 includes opening portions 310A as the light letting-in part 310. In FIG. 12B, the shutter 300 includes transparent members 310B as the light letting-in part 310. In FIG. 12C, the shutter 300 includes slits 310C as the light letting-in part 310.

The transparent member 310B is made of, for example, ground glass, or frosted glass. In other words, the transparent member 310B is a member which introduces light outside the shutter 300 but through which it is difficult to confirm an object. Therefore, it is possible to protect privacy.

The number of light letting-in parts 310 may be one or plural, and, for example, a shape or a size thereof is not limited to FIGS. 12A to 12C.

The light letting-in part 310 is provided at a position close to an installation surface (for example, a ceiling surface) where the camera device 200 is installed, for example, in the substantially dome-shaped shutter 300. In this case, even if the camera device 200 captures an image via the light letting-in part 310, a capturable range is limited to the vicinity of the installation surface. In this case, a person in a privacy sensing area which is imaged by the camera device 200 can confirm the light letting-in part 310 of the shutter 300 but cannot visually recognize the camera lens 260. Therefore, it is possible to minimize displeasure of the person due to image capturing performed by the camera device 200.

Since the shutter 300 includes the light letting-in part 310, a light intensity which is equal to or lower than a light intensity outside the shutter 300 can be incorporated into the shutter 300 even in a state where the shutter 300 is closed. Even in a case where a light intensity is extremely low, a light intensity which is higher than when the light letting-in part 310 is not provided can be incorporated into the shutter 300.

If light is introduced into the shutter 300, the introduced light (a light intensity or a light color) is added in a captured image. The image capturing element 210 of the camera device 200 captures an image so as to acquire an image signal in a state where light is collected from the light letting-in part 310. The exposure amount deriving unit 223A derives an exposure amount according to a luminance component of block data based on the image signal. The white balance amount deriving unit 223B derives a white balance amount according to a color component of block data based on the image signal.

The derivation of an exposure amount or a white balance amount of the image capturing element 210 is performed, for example, periodically. In addition, in a case where a time point where the shutter 300 is opened is set in advance, an exposure amount or a white balance amount may be derived at a predetermined time before the set time point. Thus, a power supply of the DSP 220 can be stopped until and before the predetermined time, and thus power can be saved.

The exposure adjustment unit 224 adjusts exposure according to an exposure amount derived by considering a light intensity which is obtained via the light letting-in part 310. The white balance adjustment unit 225 adjusts white balance according to a white balance amount derived by considering a light color which is obtained via the light letting-in part 310.

The shutter control unit 141 of the control device 100 controls the shutter 300 so as to be opened after exposure adjustment or white balance adjustment is finished in the camera device 200.

Thus, when compared with a case of a closed state of the shutter 300 in which light is scarcely detected without the light letting-in part 310, an exposure amount or a white balance amount caused by transition of open and closed states of the shutter 300 is reduced, and thus exposure adjustment time or white balance adjustment time can be reduced. In addition, since a change amount of quality of a captured image due to the exposure adjustment or the white balance adjustment is reduced, for example, a monitoring person who checks the display device 600 can be promptly accustomed to an image having undergone the exposure adjustment or the white balance adjustment. Therefore, for example, even in a case where the shutter 300 is opened according to the occurrence of a suspicious person, it is possible to monitor the suspicious person without losing the suspicious person. Thus, it is possible to improve security.

In addition, a part other than the light letting-in part 310 in the shutter 300 is formed by using a light blocking member which minimizes or prevents light from outside of the shutter 300 from being transmitted through the shutter 300. Thus, in a state where the shutter 300 is closed, the light blocking member of the shutter 300 is located in an image capturing area, and it is possible to prevent the camera device 200 from capturing an image. In addition, since it is difficult to recognize, for example, an image capturing area or an image-capturing direction of the camera device 200 of the shutter 300, it is possible to strengthen the privacy protection.

Figure 13A:
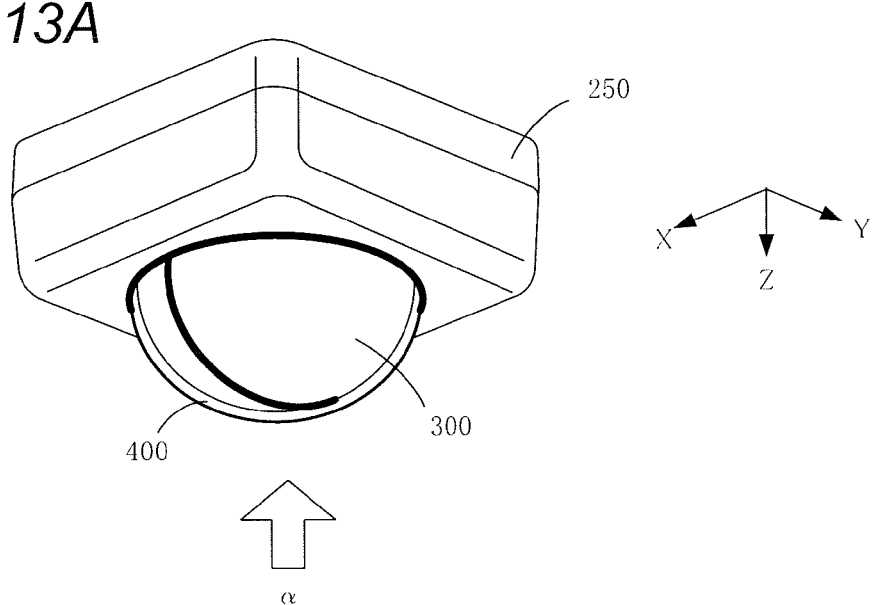
FIG. 13A is a perspective view illustrating a second modification example of a structure in the vicinity of the camera device and the shutter when the shutter is in a closed state in the first embodiment.
Figure 13B:
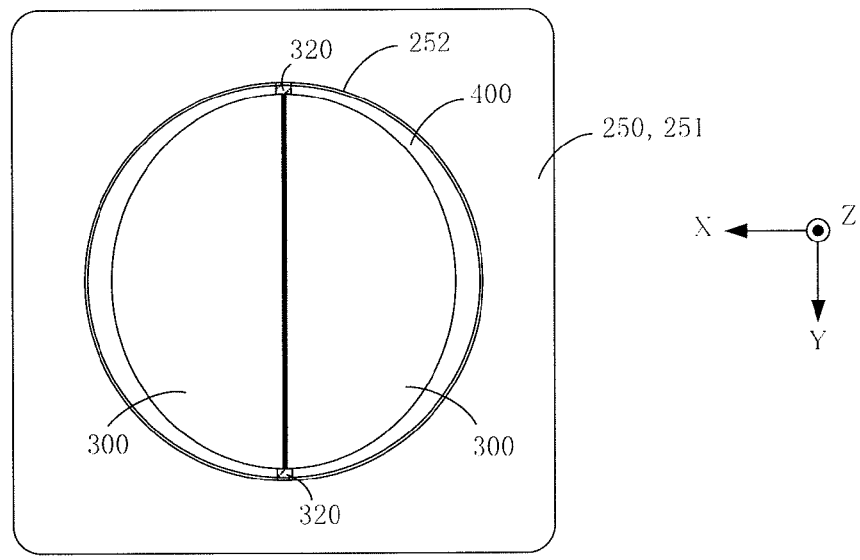
FIG. 13B is a plan view which is viewed from a positive Z axis side (a side) of FIG. 13A.

FIG. 13A is a perspective view illustrating a second modification example of a structure in the vicinity of a camera device and a shutter in a state where the shutter 300 is in a closed state. FIG. 13B is a plan view which is viewed from a positive Z axis side (a side) of FIG. 13A.

In FIGS. 13A and 13B, even in a state where the shutter 300 is closed, light enters the camera device 200 through a clearance between the camera base 250 and the shutter 300. In other words, the camera device 200 performs, for example, exposure adjustment or white balance adjustment by considering a light intensity or a light color outside the shutter 300 in the same manner as in a case where the light letting-in part 310 illustrated in FIGS. 12A to 12C is provided.

In FIG. 13B, with the center of the camera base 250 as a reference, an end of an opening 252 of the housing 251 of the camera base 250, the transparent cover 400, and the shutter 300 are arranged in this order from the outside. The shutter 300 is rotated, for example, with a support shaft 320 disposed along the Y axis so as to expose or obstruct the vicinity of the camera device 200. The support shaft 320 rotatably supports the shutter 300 at the camera base 250, and is an example of a connection member which connects the camera base 250 to the shutter 300. A drive gear (not illustrated) is rotated by a drive member (for example, a stepping motor) (not illustrated) provided in the camera base 250, and thus the shutter 300 is opened and closed. In addition, the optical unit 270 is disposed at the opening 252 of the housing 251.

In the direction along the support shaft 320, that is, in the Y axis direction, the support shaft 320 of the shutter 300 is mechanically connected to the camera base 250. For this reason, a distance between the shutter 300 and the camera base 250 in the Y axis direction is necessarily relatively shortened, and thus a clearance therebetween is relatively reduced. On the other hand, in the X axis direction perpendicular to the Y axis, a distance between the shutter 300 and the camera base 250 can be relatively freely adjusted, and thus a size of a clearance therebetween can be arbitrarily set.

For example, in a case where some light is introduced into the shutter 300 even in a state where the shutter 300 is closed, a distance between the shutter 300 and the camera base 250 in the X axis direction is made longer than in the Y axis direction. In other words, a distance between the shutter 300 and the camera base 250 is set to be inconstant. In this case, for example, a shape of an inner circumferential end 250a of the camera base 250 is a substantially circular shape, and a shape of the shutter 300 is a substantially elliptical shape in a plan view on the X-Y plane.

As mentioned above, in a state where the shutter 300 is closed, the shutter 300 and the camera base 250 are separated from each other so that light can be introduced, and the camera lens 260 is not visually recognizable. Thus, privacy can be protected, and a processing load in exposure adjustment or white balance adjustment can be reduced.

As mentioned above, according to the monitoring system 1000 of the present embodiment, even in a case where the shutter 300 is in a closed state, since light outside the shutter 300 can be introduced into the shutter 300, and exposure adjustment or white balance adjustment is performed according to a light intensity or a light color outside the shutter 300, it is possible to minimize a change in quality of a captured image even if open and closed states of the shutter 300 is changed. In addition, it is possible to reduce exposure adjustment time or white balance adjustment time. Therefore, a monitoring person easily performs monitoring, and a level of ensuring security can be improved.

Second Embodiment

In the first embodiment, light outside the shutter is introduced into the shutter, or information on a measured light intensity or a measured light color outside the shutter is acquired. In a second embodiment, a camera device measures a light intensity or a light color outside a shutter, and performs exposure adjustment or white balance adjustment according to the light intensity (measured light intensity) or the light color (measured light color) which has been measured.

Figure 14A:
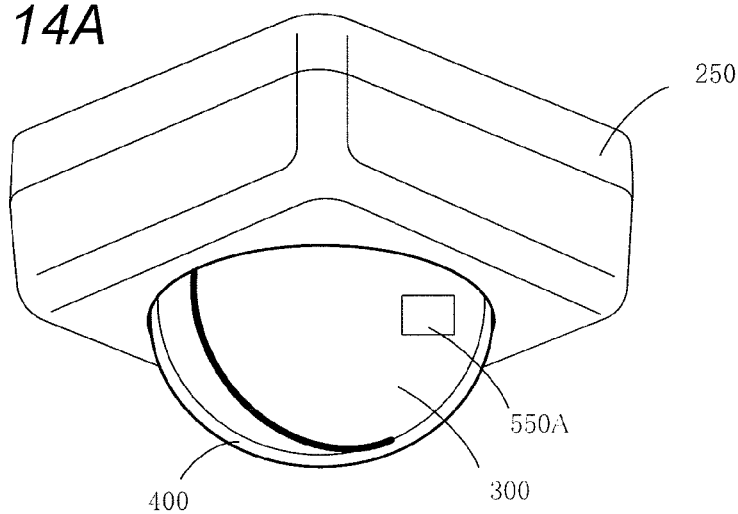
FIGS. 14A and 14B are perspective views illustrating an example of a structure in the vicinity of a camera device and a shutter when the shutter is in a closed state in a second embodiment.
Figure 14B:
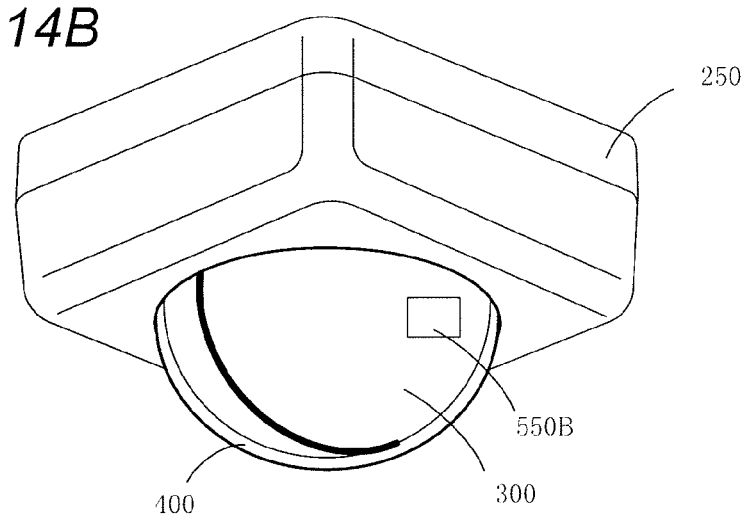

FIGS. 14A and 14B are perspective views illustrating an example of a structure in the vicinity of a camera device 200 and a shutter 300 in a state where the shutter 300 is closed in the present embodiment. It is assumed that at least a light intensity is measured in FIG. 14A, and at least a light color is measured in FIG. 14B.

As illustrated in FIG. 14A, a light sensor 550A which measures a light intensity outside the shutter 300 may be provided on an outer surface of the shutter 300. The light sensor 550A includes, for example, a photometry sensor and an illuminance sensor. The communication unit 230 of the camera device 200 acquires information on a light intensity from the light sensor 550A by using, for example, wireless communication or wired communication. In other words, the communication unit 230 is an example of a light intensity acquisition unit.

The exposure amount deriving unit 223A derives an exposure amount according to the acquired light intensity (measured light intensity). Information on a correspondence relationship between the light intensity and the exposure amount is stored in, for example, the storage unit 245. For example, the larger the light intensity is, the smaller the exposure amount is.

As mentioned above, also in a case where light outside the shutter 300 is not introduced into the shutter 300 in a state where the shutter 300 is closed, a change in an exposure amount can be reduced when the shutter 300 transitions from an open state to a closed state, and thus exposure adjustment time can be reduced.

As illustrated in FIG. 14B, a light sensor 550B which measures a light color outside the shutter 300 may be provided on the outer surface of the shutter 300. The light sensor 550B includes, for example, a color sensor and a color temperature sensor. The communication unit 230 of the camera device 200 acquires information on a light color from the light sensor 550B by using, for example, wireless communication or wired communication. In other words, the communication unit 230 is an example of a light color acquisition unit.

The white balance amount deriving unit 223B derives a white balance amount according to the acquired light color (measured light color). Information on a correspondence relationship between the light color and the white balance amount is stored in, for example, the storage unit 245.

As mentioned above, also in a case where light outside the shutter 300 is not introduced into the shutter 300 in a state where the shutter 300 is closed, a change in a white balance amount can be reduced when the shutter 300 transitions from an open state to a closed state, and thus white balance adjustment time can be reduced.

In addition, the light sensors 550A and 550B may be disposed at positions other than the outer surface of the shutter 300. For example, the light sensors 550A and 550B may be installed at any position inside the privacy sensing area where the camera device 200 is installed, and a light intensity or a light color in the privacy sensing area may be measured.

As mentioned above, according to the monitoring system 1000 of the present embodiment, even in a case where the shutter 300 is in a closed state, information on light outside the shutter 300 is acquired. In addition, since exposure adjustment or white balance adjustment is performed according to a light intensity or a light color outside the shutter 300, it is possible to reduce a change in quality of a captured image even if open and closed states of the shutter 300 are changed. In addition, it is possible to reduce exposure adjustment time or white balance adjustment time. Therefore, a monitoring person easily performs monitoring, and a level of ensuring security can be improved.

Third Embodiment

In the first embodiment, light outside the shutter is introduced into the shutter. In the second embodiment, information on a measured light intensity or a measured light color outside the shutter is acquired. In a third embodiment, a camera device estimates a light intensity or a light color outside a shutter, and performs exposure adjustment or white balance adjustment according to the light intensity (estimated light intensity) or the light color (estimated light color) which has been estimated.

Figure 15:
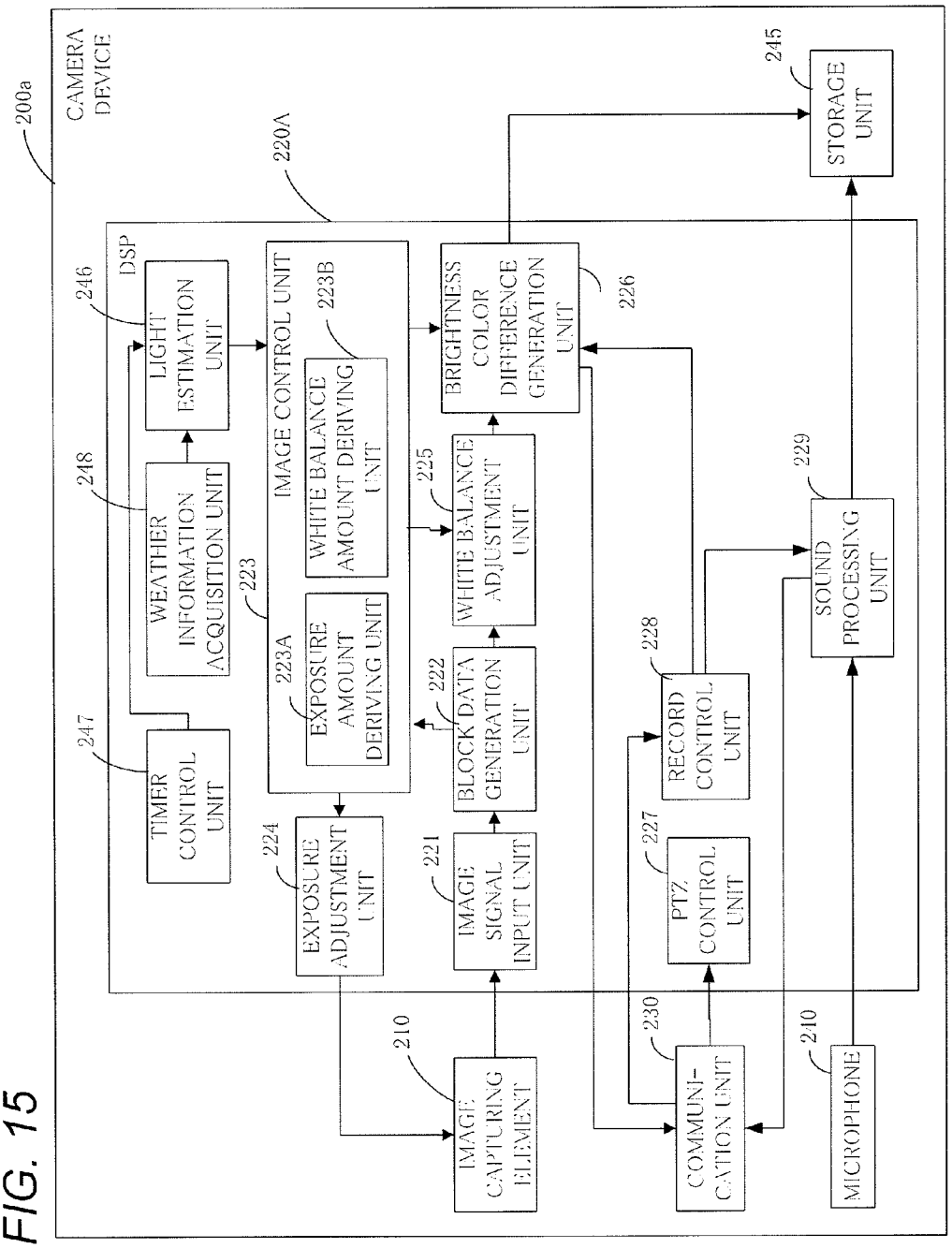
FIG. 15 is a block diagram illustrating an example of a configuration of a camera device in a third embodiment.

FIG. 15 is a block diagram illustrating a configuration example of a camera device 200a in the present embodiment. The camera device 200a includes a light estimation unit 246, a timer control unit 247, and a weather information acquisition unit 248 when compared with the camera device 200. In addition, in FIG. 15, the same constituent elements as in the camera device 200 illustrated in FIG. 4 are given the same reference numerals, and description thereof will be omitted or will be made briefly. Further, configurations of the monitoring system 1000 and other apparatuses are the same as those of in the first embodiment, and thus description thereof will be omitted.

The light estimation unit 246 estimates a light intensity or a light color outside the shutter 300 based on predetermined information (for example, time information or weather information). Information on a correspondence relationship between the time information or the weather information and an estimated light intensity or an estimated light color outside the shutter 300, which is estimated by the light estimation unit 246, is held in various tables in advance, for example.

The timer control unit 247 acquires information on time (for example, the current time), for example, by using an internal timer of the camera device 200a or through connection to a network via the communication unit 230.

The weather information acquisition unit 248 acquires information on weather (for example, fine, cloudy, rainy, or snowy), for example, through connection to a network via the communication unit 230.

A configuration of the shutter 300 in the present embodiment may be any one of FIGS. 2A to 2D, FIGS. 12A to 12C, FIGS. 13A and 13B, and FIG. 14.

FIG. 16A is a schematic diagram illustrating an example of a time table T13. The time table T13 includes, for example, information on an estimated light intensity outside the shutter 300 in each time zone. The time table T13 is stored in, for example, the storage unit 245 of the camera device 200a.

In the time table T13, for example, information on a first estimated light intensity α1 is held as an estimated light intensity in a daytime zone. In addition, information on a second estimated light intensity α2 is held as an estimated light intensity in a sunrise time zone or a sunset time zone. Further, information on a third estimated light intensity α3 is held as an estimated light intensity in a nighttime zone.

The estimated light intensity α2 in the daytime zone is higher than the estimated light intensities α2 and α3 in the other time zones. The exposure amount deriving unit 223A derives an exposure amount corresponding to an estimated light intensity, for example, by referring to the information on a correspondence relationship between a light intensity and an exposure amount, stored in the storage unit 245.

The estimated light intensity α3 in the nighttime zone is lower than the estimated light intensities α1 and α2 in the other time zones. The exposure amount deriving unit 223A derives an exposure amount corresponding to an estimated light intensity (for example, completely dark), for example, by referring to the information on a correspondence relationship between a light intensity and an exposure amount, stored in the storage unit 245.

The estimated light intensity α2 in the sunrise time zone and the sunset time zone is a level (intermediate level) between the estimated light intensity α1 in the daytime zone and the estimated light intensity α3 in the nighttime zone. The exposure amount deriving unit 223A derives an exposure amount corresponding to an estimated light intensity (for example, a light intensity at a sunrise glow or a sunset glow), for example, by referring to the information on a correspondence relationship between a light intensity and an exposure amount, stored in the storage unit 245.

In addition, the exposure amounts α1 to α3 may be set, for example, with fine weather in each time zone as a reference. Further, the time zone may be further subdivided so that more information on estimated light intensities may be held.

In addition, as illustrated in FIG. 16A, in the same manner as the information on a correspondence relationship between a time zone and an estimated light intensity, information on a correspondence relationship between a time zone and an estimated light color (β1 to β3) may be included in the time table T13.

As mentioned above, since, in a closed state, a light intensity or a light color is estimated according to the time, and exposure adjustment or white balance adjustment is adjusted in advance according to the estimated light intensity or the estimated light color, it is possible to reduce a change in quality of a captured image even if the shutter 300 transitions from a closed state to a open state. In addition, it is possible to reduce exposure adjustment time or white balance adjustment time. Therefore, a monitoring person easily performs monitoring, and a level of ensuring security can be improved.

In addition, in a case where the privacy sensing area is an office, a light intensity or a light color outside the shutter 300 may be estimated depending on work hours in consideration of turning-on and turning-off of lighting lamps. For example, in a case where a worker is estimated to be present even during the nighttime, the light estimation unit 246 may derive the estimated light intensity α1 or the estimated light color β1 corresponding to the daytime zone. Further, in a case where a worker is estimated to be absent due to holidays even during the daytime, the light estimation unit 246 may derive the estimated light intensity α3 or the estimated light color 133 corresponding to the nighttime zone.

FIG. 16B is a schematic diagram illustrating an example of a weather information table T14. The weather information table T14 includes, for example, information on an estimated light intensity outside the shutter 300 in each weather state. The weather information table T14 is stored in, for example, the storage unit 245 of the camera device 200a.

In the weather information table T14, information on a fourth estimated light intensity α4 is held as an estimated light intensity in a case of fine weather. In addition, information on a fifth estimated light intensity α5 is held as an estimated light intensity in a case of cloudy weather. Further, information on a sixth estimated light intensity α6 is held as an estimated light intensity in a case of rainy weather. Furthermore, information on a seventh estimated light intensity α7 is held as an estimated light intensity in a case of snowy weather.

The estimated light intensity α4 in a case of the fine weather is higher than the estimated light intensities in the other weather states. The estimated light intensity α6 in a case of the rainy weather is lower than the estimated light intensities in the other weather states. The estimated light intensity α5 in a case of the cloudy weather is a level (intermediate level) between the estimated light intensity α4 in a case of the fine weather and the estimated light intensity α6 in a case of the rainy weather. It is considered that the estimated light intensity α7 in a case of the snowy weather is a level, for example, between the estimated light intensity α4 in a case of the fine weather and the estimated light intensity α5 in a case of the cloudy weather, taking into consideration the fact that light is considerably reflected by snow.

The exposure amount deriving unit 223A derives an exposure amount corresponding to an estimated light intensity, for example, by referring to the information on a correspondence relationship between a light intensity and an exposure amount, stored in the storage unit 245.

In addition, the exposure amounts α4 to α6 may be set, for example, with the daytime zone in each weather state as a reference.

In addition, as illustrated in FIG. 16B, in the same manner as the information on a correspondence relationship between weather and an estimated light intensity, information on a correspondence relationship between weather and an estimated light color (β4 to β7) may be included in the weather information table T14.

Further, the light estimation unit 246 may estimate a light intensity or a light color outside the shutter 300, for example, according to information on the season. Furthermore, the light estimation unit 246 may estimate a light intensity or a light color outside the shutter 300 according to at least two of information at the current time, weather information, and information on the season.

As mentioned above, since, in a closed state, a light intensity or a light color is estimated according to weather, and exposure adjustment or white balance adjustment is performed in advance according to the estimated light intensity or the estimated light color, it is possible to reduce a change in quality of a captured image even if the shutter 300 transitions from a closed state to a open state. In addition, it is possible to reduce exposure adjustment time or white balance adjustment time. Therefore, a monitoring person easily performs monitoring, and a level of ensuring security can be improved.

Next, a description will be made of timing of performing automatic exposure adjustment or automatic white balance adjustment.

In a case where light is incorporated into the shutter 300 even in a state where the shutter 300 is closed, the exposure adjustment unit 224 may perform automatic exposure adjustment according to the information on a correspondence relationship between a luminance level and an exposure amount, stored in the storage unit 245. Also in this case, it is possible to perform exposure adjustment in which a light intensity outside the shutter 300 is reflected.

On the other hand, in a case where light is not incorporated into the shutter 300 and a light intensity outside the shutter 300 is acquired or estimated in a state where the shutter 300 is closed, the exposure adjustment unit 224 may stop the automatic exposure adjustment. In other words, exposure adjustment based on a luminance component of a captured image is stopped, and, alternatively, the exposure adjustment is performed on the basis of a measured light intensity or an estimated light intensity outside the shutter 300.

In addition, the exposure adjustment unit 224 starts and restarts the automatic exposure adjustment after the shutter 300 is opened. In other words, the exposure adjustment unit 224 performs exposure adjustment according to a luminance component of a captured image.

As mentioned above, the automatic exposure adjustment may be stopped in a state where the shutter 300 is closed, and the automatic exposure adjustment may be performed in a state where the shutter 300 is open. Thus, even in a case where the camera device 200a cannot incorporate sufficient light thereinto, it is possible to prevent exposure adjustment from being performed so as to be suitable for a dark state, and to prepare for a case where the shutter 300 is opened.

In addition, in a case where light is incorporated into the shutter 300 even in a state where the shutter 300 is closed, the white balance adjustment unit 225 may perform automatic white balance adjustment according to the information on a correspondence relationship between a color level and an exposure amount, stored in the storage unit 245. Also in this case, it is possible to perform white balance adjustment in which a light color outside the shutter 300 is reflected.

On the other hand, in a case where light is not incorporated into the shutter 300 and a light color outside the shutter 300 is acquired or estimated in a state where the shutter 300 is closed, the white balance adjustment unit 225 may stop the automatic white balance adjustment. In other words, white balance adjustment based on a color component of a captured image is stopped, and, alternatively, the white balance adjustment is performed on the basis of a measured light color or an estimated light color outside the shutter 300.

In addition, the white balance adjustment unit 225 starts and restarts the automatic white balance adjustment after the shutter 300 is opened. In other words, the white balance adjustment unit 225 performs white balance adjustment according to a color component of a captured image.

As mentioned above, the automatic exposure adjustment or the automatic white balance adjustment may be stopped in a state where the shutter 300 is closed, and the automatic exposure adjustment or the automatic white balance adjustment may be performed in a state where the shutter 300 is open. Thus, even in a case where the camera device 200a cannot incorporate sufficient light thereinto, it is possible to prevent exposure adjustment or white balance adjustment from being performed so as to be suitable for a dark state, and to prepare for a case where the shutter 300 is opened.

As mentioned above, according to the monitoring system 1000 of the present embodiment, even in a case where the shutter 300 is in a closed state, and a state of light outside the shutter 300 cannot be directly visually recognized by the camera device 200a, it is possible to estimate a light intensity or a light color outside the shutter 300. In addition, since exposure adjustment or white balance adjustment is performed according to the estimated light intensity or the estimated light color, it is possible to reduce a change in quality of a captured image even if open and closed states of the shutter 300 are changed. In addition, it is possible to reduce exposure adjustment time or white balance adjustment time. Therefore, a monitoring person easily performs monitoring, and a level of ensuring security can be improved.

In a camera system of the related art, in order to protect privacy, for example, in a case where a person is present in a predetermined area, the shutter 300 is closed, and thus light outside the shutter 300 cannot be detected. For this reason, a sudden change in luminance cannot be rapidly tracked in a case where the shutter 300 is opened, and thus quality of a captured image may deteriorate. When compared with the camera system of the related art, the monitoring system 1000 in the first embodiment or the second embodiment can perform exposure adjustment or white balance adjustment from a stage of a state where the shutter 300 is closed, in consideration of light outside the shutter 300. Therefore, it is possible to improve quality of a captured image, and thus to strengthen security.

In addition, the present invention is not limited to the configurations of the above-described embodiments, and may employ any configuration as long as the configuration can achieve the functions shown in the claims, or the functions of the constituent elements of the present embodiments.

For example, in the embodiments, the camera devices 200 and 200a may perform image processing other than the white balance adjustment. In this image processing, a parameter which varies depending on a light intensity inside the shutter 300, or a luminance component or a color component of block data, is used.

In addition, in the embodiments, in the camera devices 200 and 200a, in a case where the shutter 300 is closed, image capturing may be performed, and may not be performed.

In addition, in the embodiments, even in a case where the shutter 300 is closed, a captured image may be periodically transmitted to the control device 100.

Further, in the embodiments, the shutter 300 may be provided outside the transparent cover 400.

Furthermore, in the embodiments, sound collecting or sound recording using the microphone of the camera device 200 or 200a may be omitted.

In addition, in the embodiments, the event priority and the schedule priority may be reversed to each other. For example, the schedule priority may be set when the shutter 300 is turned to an open state. In this case, unless an operation mode transitions to the monitoring mode according to a schedule even if an opening event is detected, the shutter 300 is not opened. Thus, it is possible to prioritize ensuring of security.

Further, in the embodiments, it is assumed that there is a closing event or a closing schedule (non-monitoring mode), but a duration of an opening event may be set in advance. In this case, the shutter 300 may be turned to a closed state after a predetermined time has elapsed from the start of an opening event or the start of the monitoring mode.

In addition, the embodiments have mainly exemplified that the control device 100 transmits various instruction signals to the camera devices 200 and 200a, and the camera devices 200 and 200a are operated on the basis of the instruction signals. Further, the camera devices 200 and 200a may detect various events, and may be autonomously operated.

Summary of Aspects of the Invention

An aspect of the present invention provides an image-capturing apparatus for capturing an image, the apparatus including: an imaging device, configured to obtain an image signal; a light-intensity estimator, configured to estimate a light intensity outside a shutter that limits an image capturing area of the imaging device in a state where the shutter is closed; and an exposure adjustor, configured to adjust an exposure of the imaging device located inside the shutter according to the estimated light intensity.

According to this configuration, it is possible to perform exposure adjustment according to a light intensity outside the shutter in a state where the shutter is closed, and thus to reduce exposure adjustment after the shutter is opened. For example, it is possible to reduce the exposure adjustment time required for the exposure adjustment, and thus to reduce an exposure amount which is adjusted through the exposure adjustment. In addition, it is possible to minimize a change (for example, overexposure) in image quality due to a sudden change in light and shade, and thus a monitoring person can easily perform monitoring. Therefore, it is possible to improve a level of ensuring security.

The image-capturing apparatus may be configured so that the exposure adjustor adjusts the exposure of the imaging device based on a luminance component of the image signal when the shutter is open, and adjusts the exposure of the imaging device based on the light intensity estimated by the light-intensity estimator when the shutter is closed.

The image-capturing apparatus may be configured so that the exposure adjustor adjusts the exposure of the imaging device based on the light intensity estimated by the light-intensity estimator without referring to the luminance component of the image signal when the shutter is closed.

According to this configuration, even in a state (for example, a dark state) where the shutter is closed and thus a light intensity is low, exposure adjustment can be performed according to a light intensity outside the shutter without performing exposure adjustment according to a state where a light intensity is low due to automatic exposure adjustment. Therefore, after the shutter is opened, an appropriate exposure state can rapidly occur.

The image-capturing apparatus may be configured by further including a light-intensity sensor disposed outside the shutter, wherein the light-intensity estimator estimates the light intensity outside the shutter based on information detected by the light-intensity sensor.

According to this configuration, even in a state where the shutter is closed, a light intensity outside the shutter can be recognized, and exposure adjustment can be performed.

The image-capturing apparatus may be configured by further including a timer controller, configured to obtain a time of day, wherein the light-intensity estimator estimates the light intensity outside the shutter according to the time of day obtained by the timer controller.

According to this configuration, a light intensity can be estimated according to, for example, the daytime zone, the nighttime zone, the sunrise time zone, or the sunset time zone, and this light intensity can be reflected in exposure adjustment.

The image-capturing apparatus may be configured by further including a weather information obtaining unit, configured to obtain weather information, wherein the light-intensity estimator estimates the light intensity outside the shutter according to the weather information obtained by the weather information obtaining unit.

According to this configuration, for example, light intensities can be estimated according to, for example, various weather states (fine, cloudy, rainy, and snowy), and these light intensities can be reflected in exposure adjustment.

The image-capturing apparatus may be configured by further including: a light-color estimator, configured to estimate a light color outside the shutter in the state where the shutter is closed; and an image processor, configured to perform an image processing on the image signal based on the light color estimated by the light-color estimator.

According to this configuration, it is possible to perform image processing according to a light color outside the shutter in a state where the shutter is closed, and thus to reduce image processing after the shutter is opened. For example, it is possible to reduce the image processing time required for processing an image, and to reduce an amount of images to be processed. In addition, it is possible to minimize a change in image quality due to a sudden change in light and shade, and thus a monitoring person can easily perform monitoring. Therefore, it is possible to improve a level of ensuring security.

The image-capturing apparatus may be configured so that the image processor includes a white balance adjustor, configured to adjust a white balance on the image signal based on the light color estimated by the light-color estimator.

According to this configuration, it is possible to reduce an adjustment amount and an adjustment time related to white balance adjustment after the shutter is opened.

The image-capturing apparatus may be configured by further including a light-color sensor disposed outside the shutter, wherein the light-color estimator estimates the light color based on information detected by the light-color sensor.

According to this configuration, even in a state where the shutter is closed, a light color outside the shutter can be recognized, and thus image processing can be performed.

The image-capturing apparatus may be configured by further including a timer controller, configured to obtain a time of day, wherein the light-color estimator estimates the light color outside the shutter according to the time of day obtained by the timer controller.

According to this configuration, a light color can be estimated according to, for example, the daytime zone, the nighttime zone, the sunrise time zone, or the sunset time zone, and this light color can be reflected in white balance adjustment.

The image-capturing apparatus may be configured by further including a weather information obtaining unit, configured to obtain weather information, wherein the light-color estimator estimates the light color outside the shutter according to the weather information obtained by the weather information obtaining unit.

According to this configuration, for example, light colors can be estimated according to, for example, various weather states (fine, cloudy, rainy, and snowy), and these light colors can be reflected in white balance adjustment.

Another aspect of the present invention provides a shutter that limits an image capturing area of an image-capturing apparatus for capturing an image, the shutter including: a base that accommodates the image capturing apparatus; a light blocking part attached to the base and located in the image capturing area of the image-capturing apparatus to block a light outside the shutter; and a light letting-in part that lets in the light outside the shutter when the light outside the shutter is blocked by the light blocking part.

According to this configuration, even in a state where the shutter is closed, it is possible to easily incorporate light outside the shutter to the inside of the shutter. Therefore, even in a state where the shutter is closed, it is possible to perform, for example, exposure adjustment or image processing in a state close to a state where the shutter is open. Thus, it is possible to minimize a change in image quality due to a sudden change in light and shade, and thus a monitoring person can easily perform monitoring. Therefore, it is possible to improve a level of ensuring security. In addition, even in a case where a person is present in an image-capturing area of the image-capturing apparatus, it is possible to protect privacy without causing distrust in a state where the shutter is closed.

The shutter may be configured so that the light letting-in part is a hole formed in the light blocking part.

The shutter may be configured so that the hole is located outside the image capturing area of the image-capturing apparatus when the light outside the shutter is blocked by the light blocking part.

According to this configuration, it is possible to incorporate light outside the shutter to inside of the shutter.

The shutter may be configured so that the light letting-in part is formed of a transparent member.

According to this configuration, it is possible to incorporate light outside the shutter to inside of the shutter. In addition, for example, since a ground glass or a frosted glass is used, even if a person confirms the light letting-in part, it is difficult to visually recognize a position of the camera lens, and thus it is possible to minimize the occurrence of distrust.

The shutter may be configured so that the light letting-in part is a clearance formed between the base and the light blocking part when the light outside the shutter is blocked by the light blocking part.

According to this configuration, a clearance occurs between the base and the shutter of the image-capturing apparatus, and light outside the shutter can be incorporated into the shutter. Therefore, it is possible to perform exposure adjustment in which a light intensity incorporated into the shutter is reflected.

The shutter may be configured so that the clearance is formed smaller at a position where the base supports the light blocking part than other positions.

According to this configuration, the shutter can be opened and closed, and exposure adjustment can be mainly performed according to a light intensity incorporated into the shutter from outside of the shutter at positions other than the vicinity of the connection member.

Still another aspect of the present invention provides an image-capturing apparatus for capturing an image, the apparatus including: an imaging device, configured to obtain an image signal; the shutter; and an exposure adjustor, configured to adjust an exposure of the imaging device located inside the shutter.

According to this configuration, it is possible to perform exposure adjustment according to a light intensity outside the shutter in a state where the shutter is closed, and thus to reduce exposure adjustment after the shutter is opened. For example, it is possible to reduce the exposure adjustment time required for the exposure adjustment, and thus to reduce an exposure amount which is adjusted through the exposure adjustment. In addition, it is possible to minimize a change (for example, overexposure) in image quality due to a sudden change in light and shade, and thus a monitoring person can easily perform monitoring. Therefore, it is possible to improve a level of ensuring security.

Still another aspect of the present invention provides a method for adjusting an exposure by use of an image-capturing apparatus for capturing an image and a shutter for covering the image-capturing apparatus, the method including: estimating a light intensity outside the shutter that limits an image capturing area of an imaging device in a state where the shutter is closed; and adjusting an exposure of the imaging device located inside the shutter according to the estimated light intensity.

According to this method, it is possible to perform exposure adjustment according to a light intensity outside the shutter in a state where the shutter is closed, and thus to reduce exposure adjustment after the shutter is opened. For example, it is possible to reduce the exposure adjustment time required for the exposure adjustment, and thus to reduce an exposure amount which is adjusted through the exposure adjustment. In addition, it is possible to minimize a change (for example, overexposure) in image quality due to a sudden change in light and shade, and thus a monitoring person can easily perform monitoring. Therefore, it is possible to improve a level of ensuring security.

The present invention is useful for a shutter, an image-capturing apparatus and an exposure adjustment method capable of protecting privacy or improving a level of ensuring of security.

What is claimed is:

1. An image-capturing apparatus for capturing an image, the image-capturing apparatus comprising:
    an imaging device, configured to obtain an image signal;
    a shutter, configured, in a closed state, to obstruct a front surface of a lens in an image capturing direction and, in an open state, to open the front surface of the lens in the image capturing direction;
    a light-intensity estimator, configured to estimate a light intensity of light outside the shutter when the shutter is closed; and
    an exposure adjustor, configured to adjust an exposure of the imaging device located inside the shutter according to the estimated light intensity,
    wherein, in the closed state of the shutter, the light outside the shutter is let into the image-capturing apparatus via a light letting-in part of the shutter for estimating the light intensity by the light-intensity estimator.

2. The image-capturing apparatus according to claim 1, wherein
    the exposure adjustor adjusts the exposure of the imaging device based on a luminance component of the image signal when the shutter is open, and adjusts the exposure of the imaging device based on the light intensity estimated by the light-intensity estimator when the shutter is closed.

3. The image-capturing apparatus according to claim 2, wherein
    the exposure adjustor adjusts the exposure of the imaging device based on the light intensity estimated by the light-intensity estimator without referring to the luminance component of the image signal when the shutter is closed.

4. The image-capturing apparatus according to claim 1, further comprising:
    a timer controller, configured to obtain a time of day, wherein
    the light-intensity estimator estimates the light intensity outside the shutter according to the time of day obtained by the timer controller.

5. The image-capturing apparatus according to claim 1, further comprising:
    a weather information obtainer, configured to obtain weather information, wherein
    the light-intensity estimator estimates the light intensity outside the shutter according to the weather information obtained by the weather information obtainer.

6. The image-capturing apparatus according to claim 1, further comprising:
    a light-color estimator, configured to estimate a light color outside the shutter in the state where the shutter is closed; and
    an image processor, configured to perform an image processing on the image signal based on the light color estimated by the light-color estimator.

7. The image-capturing apparatus according to claim 6, wherein
    the image processor includes a white balance adjustor, configured to adjust a white balance on the image signal based on the light color estimated by the light-color estimator.

8. The image-capturing apparatus according to claim 6, further comprising:

a light-color sensor disposed outside the shutter, wherein
the light-color estimator estimates the light color based on information detected by the light-color sensor.

9. The image-capturing apparatus according to claim 6, further comprising:
a timer controller, configured to obtain a time of day, wherein
the light-color estimator estimates the light color outside the shutter according to the time of day obtained by the timer controller.

10. The image-capturing apparatus according to claim 1, further comprising:
a weather information obtainer, configured to obtain weather information, wherein
the light-color estimator estimates the light color outside the shutter according to the weather information obtained by the weather information obtainer.

11. An image capturing apparatus for capturing an image, the image-capturing apparatus comprising:
an imaging device, configured to obtain an image signal;
a shutter, configured, in a closed state, to obstruct a front surface of a lens in an image capturing direction and, in an open state, to open the front surface of the lens in the image capturing direction;
a light-intensity estimator, configured to estimate a light intensity of light outside the shutter when the shutter is closed;
an exposure adjustor, configured to adjust an exposure of the imaging device located inside the shutter according to the estimated light intensity;
a base that accommodates the imaging device;
the shutter attached to the base and located in an image capturing area of the imaging device to block the light outside the shutter; and
a light admitter that lets in the light outside the shutter when the light outside the shutter is blocked by the shutter.

12. The image capturing apparatus according to claim 11, wherein
the light admitter is a hole in the shutter.

13. The image capturing apparatus according to claim 12, wherein
the hole is located outside the image capturing area of the imagining device when the light outside the shutter is blocked by the shutter.

14. The image capturing apparatus according to claim 11, wherein
the light admitter is a transparent member.

15. The image capturing apparatus according to claim 11, wherein
the light admitter is a clearance between the base and the shutter when the light outside the shutter is blocked by the shutter.

16. The image capturing apparatus according to claim 11, wherein
the clearance is smaller at a position where the base supports the shutter than at other positions.

17. A method for adjusting an exposure by use of an image-capturing apparatus for capturing an image and a shutter for covering the image-capturing apparatus, the method comprising:
obstructing, by a shutter, in a closed state, a front surface of a lens in an image capturing direction and opening, by the shutter in an open state, the front surface of the lens in the image capturing direction;
estimating a light intensity of light outside the shutter that limits an image capturing area of an imaging device when the shutter is closed; and
adjusting an exposure of the imaging device located inside the shutter according to the estimated light intensity,
wherein, in the closed state of the shutter, the light outside the shutter is let into the image-capturing apparatus via a light letting-in part of the shutter for estimating the light intensity.

18. The method according to claim 17, further comprising:
obtaining a time of day and estimating the light intensity outside the shutter according to the obtained time of day.

19. The method according to claim 17, further comprising:
obtaining weather information and estimating the light intensity outside the shutter according to the obtained weather information.

* * * * *